US008181989B2

(12) United States Patent
Okuhara

(10) Patent No.: US 8,181,989 B2
(45) Date of Patent: May 22, 2012

(54) SIDE AIRBAG APPARATUS

(75) Inventor: Masaaki Okuhara, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 126 days.

(21) Appl. No.: 12/662,898

(22) Filed: May 11, 2010

(65) Prior Publication Data

US 2010/0308568 A1 Dec. 9, 2010

(30) Foreign Application Priority Data

Jun. 5, 2009 (JP) ................................ 2009-136202

(51) Int. Cl.
*B60R 21/207* (2006.01)
*B60R 21/233* (2006.01)

(52) U.S. Cl. ................... 280/730.2; 280/729; 280/743.1

(58) Field of Classification Search .................. 280/729, 280/730.2, 740, 742, 743.1
See application file for complete search history.

(56) References Cited

U.S. PATENT DOCUMENTS

| 6,270,113 | B1 * | 8/2001 | Wipasuramonton et al. | 280/730.2 |
|---|---|---|---|---|
| 6,302,431 | B1 * | 10/2001 | Sasaki et al. | 280/728.2 |
| 6,364,348 | B1 * | 4/2002 | Jang et al. | 280/730.2 |
| 6,478,329 | B1 * | 11/2002 | Yokoyama | 280/729 |
| 6,612,610 | B1 * | 9/2003 | Aoki et al. | 280/730.2 |
| 6,827,368 | B2 * | 12/2004 | Jang et al. | 280/729 |
| 6,976,702 | B2 * | 12/2005 | Yokota et al. | 280/730.2 |
| 7,156,418 | B2 * | 1/2007 | Sato et al. | 280/730.2 |
| 7,192,050 | B2 * | 3/2007 | Sato et al. | 280/729 |
| 7,316,415 | B2 * | 1/2008 | Jamison | 280/729 |
| 7,347,444 | B2 * | 3/2008 | Wheelwright | 280/729 |
| 7,422,235 | B2 * | 9/2008 | Wollin et al. | 280/730.2 |
| 7,431,329 | B2 * | 10/2008 | Taguchi et al. | 280/729 |
| 7,431,332 | B2 * | 10/2008 | Wipasuramonton et al. | 280/730.2 |
| 7,448,645 | B2 * | 11/2008 | Bederka et al. | 280/730.2 |
| 7,611,164 | B2 * | 11/2009 | Kai et al. | 280/729 |
| 7,637,530 | B2 * | 12/2009 | Yamaji et al. | 280/730.2 |

(Continued)

FOREIGN PATENT DOCUMENTS

JP  A-2005-053465  3/2005

(Continued)

*Primary Examiner* — Paul N Dickson
*Assistant Examiner* — Laura Freedman
(74) *Attorney, Agent, or Firm* — Posz Law Group, PLC

(57) ABSTRACT

An airbag 40 includes a pair of fabric main portions 43, 44, which are laid on top of each other in the width direction of a vehicle. The fabric main portions 43, 44 are joined to each other at the periphery. An inflator 31 incorporated in the airbag 40 jets inflation gas G through gas outlet 33, thereby inflating and deploying the airbag 40 forward in a space between an occupant P and a body side portion. A third reinforcing fabric sheet 55 includes a reinforcing fabric portions 57, 58. The reinforcing fabric portions 57, 58 extend to a position forward of a center portion C of the fabric main portions 43, 44 in a front-rear direction from the rear ends of the fabric main portions 43, 44, which are located outside of the reinforcing fabric portions 57, 58. The front ends of the reinforcing fabric portions 57, 58 are joined (sewn) to the fabric main portions 43, 44 by front joint portions 66. The outer reinforcing fabric portion 58 has a hole 67 in a part between a rear end 58R and the front joint portion 66.

7 Claims, 17 Drawing Sheets

U.S. PATENT DOCUMENTS

| | | | |
|---|---|---|---|
| 7,658,403 B2* | 2/2010 | Kawabe et al. | 280/730.2 |
| 7,798,523 B2* | 9/2010 | Shigemura | 280/730.2 |
| 7,837,226 B2* | 11/2010 | Honda et al. | 280/730.2 |
| 2004/0124615 A1* | 7/2004 | Tanase et al. | 280/730.2 |
| 2006/0038386 A1* | 2/2006 | Shibayama et al. | 280/730.2 |
| 2008/0203711 A1* | 8/2008 | Shimono | 280/730.2 |
| 2010/0133796 A1* | 6/2010 | Mizuno | 280/743.1 |

FOREIGN PATENT DOCUMENTS

JP     A-2007-186132     7/2007

* cited by examiner

Fig.12
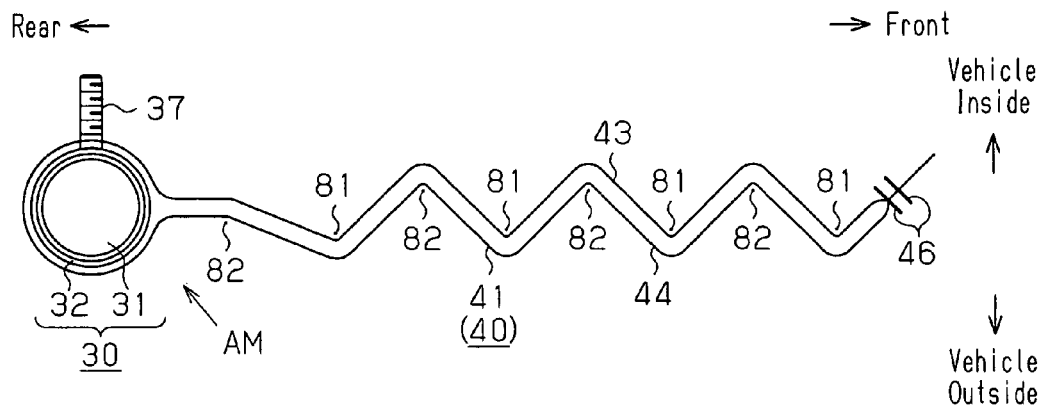
Fig.13A    Fig.13B
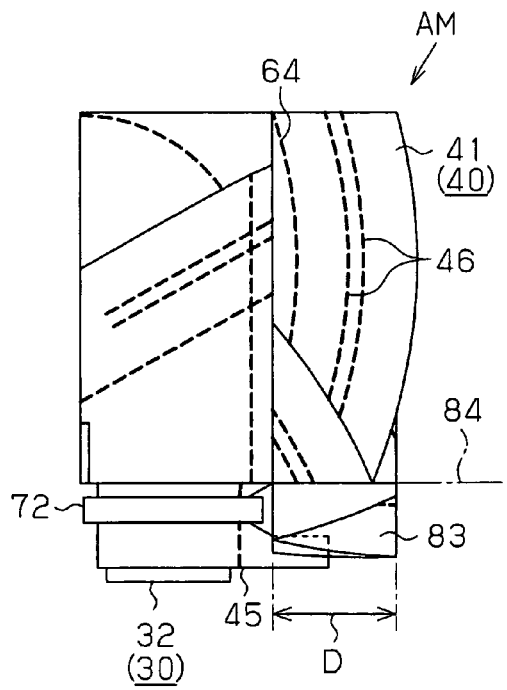  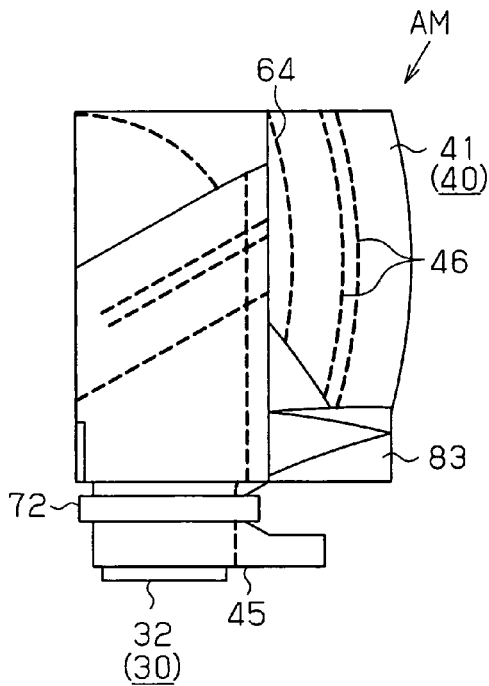

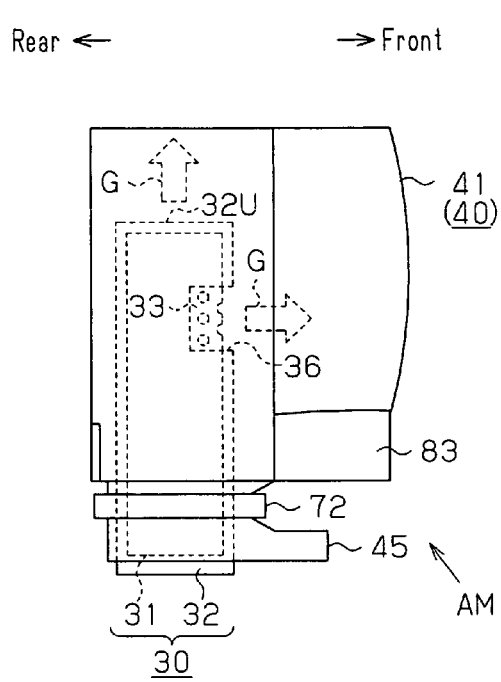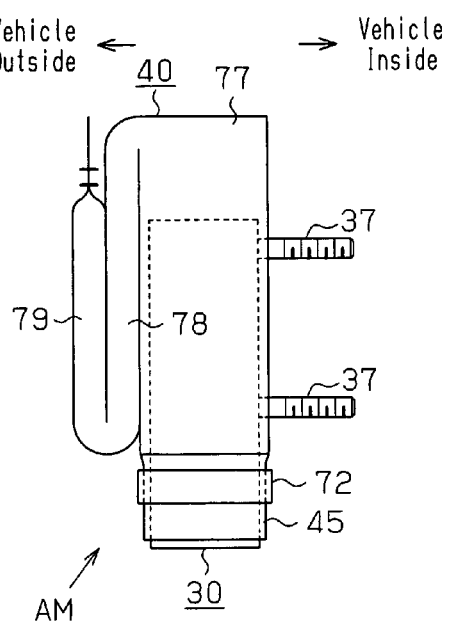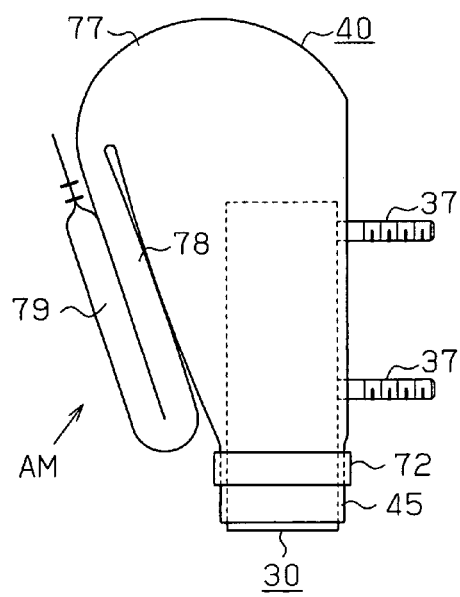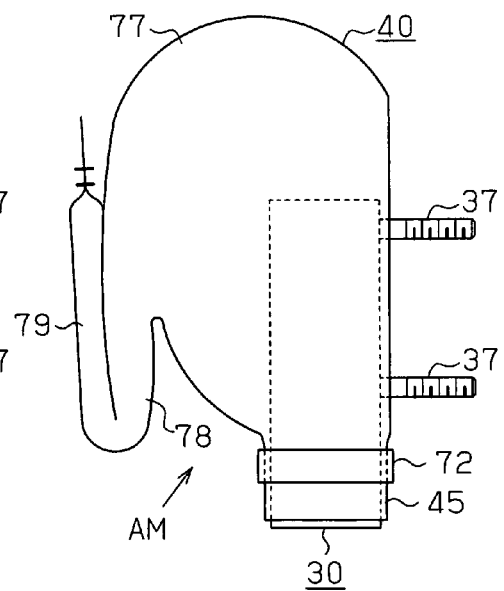

Rear ← → Front

SIDE AIRBAG APPARATUS

BACKGROUND OF THE INVENTION

The present invention relates to an airbag apparatus that inflates and deploys an airbag in a space between a vehicle body side portion and a vehicle seat when an impact is applied from a side of the vehicle, thereby attenuating the impact.

As means for protecting an occupant from an impact that is applied to a vehicle from a side due to a side collision, side airbag apparatuses widely known. FIGS. 18 to 21 show one such side airbag apparatus having an inflator 101 and an airbag 102. The airbag 102 is formed by laying a pair of fabric main portions 103 in the direction of the width of the vehicle and sewing the fabric main portions 103 together at joint portion 104 at peripheral portions. The inflator 101 is located in a rear section inside the airbag 102. After being folded into a compact form, the airbag 102, together with the inflator 101, is incorporated in a backrest 117 of a vehicle seat 116 (refer to FIG. 18). In such a side airbag apparatus, when an impact is applied from the side of a body side portion of the vehicle such as a side door, the inflator 101 jets inflation gas G into the airbag 102. The jetted inflation gas G inflates and deploys the airbag 102 toward the front of the vehicle from the backrest 117 into a narrow space between an occupant P seated in the vehicle seat 116 and the body side portion. This attenuates the impact that is transmitted from the side to the occupant P through the body side portion.

In accordance with the above described airbag apparatus, to reduce the influence of heat and pressure of the inflation gas G on a part of the airbag 102 in the vicinity of the inflator 101, reinforcing fabric sheets 105, 106 are sewn to the inner sides of the fabric main portions 103 at joint portions 107, 108 (see Japanese Laid-Open Patent Publication No. 2007-186132). Side portions 106S of the reinforcing fabric sheet 106 are folded back so that parts having multiple layers are formed in the reinforcing fabric sheet 106 (see FIGS. 19 and 20).

Representative examples of parts to be reinforced by the reinforcing fabric sheets 105, 106 include parts in the vicinity of gas outlet 101A of the inflator 101, that is rear parts of the airbag 102.

In the side of the human body, lumbar regions are known to have a better impact resistance than the thorax and abdomen. Therefore, when the airbag 102 is inflated and deployed, and pushes an arm PA of the occupant P inward in the width direction of the vehicle, the arm PA is likely to push the thorax and abdomen PB, which have relatively low impact resistance.

Accordingly, the airbag 102 is provided with an annular inflation limiting portion 109 at a position corresponding to the arm PA of the occupant P (refer to Japanese Laid-Open Patent Publication No. 2007-186132 and Japanese Laid-Open Patent Publication No. 2005-053465). The inflation limiting portion 109 is formed by sewing the fabric main portions 103 to each other at a position corresponding to the arm PA of the occupant P, while placing the fabric main portions 103 close to each other. According to the side airbag apparatus having the inflation limiting portion 109, the thickness of the airbag 102 along the vehicle width at the time when the airbag 102 is inflated and deployed is limited in a region where the inflation limiting portion 109 is provided. Accordingly, the arm PA is less likely to be pushed inward along the vehicle width direction by the airbag 102 and press the thorax and the abdomen PB.

Being located at a position forward of the gas outlet 101A of the inflator 101, the inflation limiting portion 109 is susceptible to heat and pressure of the inflation gas G. Accordingly, the inflation limiting portion 109 is also reinforced by the reinforcing fabric sheets 110. The reinforcement by the reinforcing fabric sheets 110 is executed by placing the reinforcing fabric sheets 110 at positions that are inside of the fabric main portions 103 and correspond to the arm PA of the occupant P. The reinforcing fabric sheets 110 are sewn to the fabric main portions 103 at joint portions 111. Accordingly, the reinforcing fabric sheets 110 and the fabric main portions 103 located outside of the reinforcing fabrics 110 are sewn together by the inflation limiting portion 109. Sewing threads used for forming the inflation limiting portion 109 have higher strength against heat and pressure than the sewing threads for forming the joint portions 111.

Further, the peripheral portions of the fabric main portions 103 may be reinforced by upper and lower reinforcing fabric sheets 112, 113. The upper and lower reinforcing fabric sheets 112, 113 are sewn to the peripheral portions of the fabric main portions 103 by joint portions 114.

However, when the separate reinforcing fabric sheets 105, 106, 110, 112, 113 are used for different parts to be reinforced, the number of reinforcing fabric sheets is increased. Accordingly, when joining the reinforcing fabric sheets 105, 106, 110, 112, 113 to the airbag 102, the reinforcing fabric sheets 105, 106, 110, 112, 113 need to be placed one by one on the corresponding parts of the fabric main portions 103 to be reinforced. Thus, the arrangement is troublesome and takes a long time.

Although providing the different reinforcing fabric sheets 105, 106, 110, 112, 113 for different parts to be reinforced reduces the influence of heat and pressure of the inflation gas G on each part of the airbag 102, particularly, on the joint portions 104, 107 to 109, and 111, there is still room for improvement. Specifically, the inflation gas G, which is jetted forward from the inflator 101, separates the rear edge of each reinforcing fabric sheet 110 from the fabric main portion 103 located adjacent to and outside of the reinforcing fabric sheet 110, and enters the gap created by the separation. In such a case, the inflation gas G is likely to stay in the gap after hitting the rear section of the joint portion 111 in the gap. As this phenomenon continues, the rear section of the joint portion 111 is influenced by the pressure and heat of the inflation gas G. Accordingly, holes in the reinforcing fabric sheets 110 and the fabric main portions 103 in the joint portion 111, through which sewing threads are passed, are enlarged. In other words, enlarged apertures appear. Particularly, as the costs for the inflator 101 have been reduced in recent years, the temperature of the inflation gas G tends to be increased. The use of the inflator 101 increases the above described influence.

To deal with the above described phenomenon, the present inventors have concluded that it is effective to use a single long slender reinforcing fabric sheet extending in the front-rear direction to reinforce parts to be reinforced that are adjacent to each other in the front-rear direction, particularly parts in the vicinity of the inflator and parts in the vicinity of the inflation limiting portion. In this case, arranging the single reinforcing fabric sheet allows a plurality of parts to be reinforced at a time. This reduces the steps for arranging multiple reinforcing fabric sheets. However, it has been found that this will cause other problems. That is, since the reinforcing fabric sheet has a long slender shape, parts of the fabric main portions where the reinforcing fabric sheets are provided are harder to stretch and inflate than parts where the reinforcing fabric sheets are not provided. In the fabric main portions, the amount of stretch (inflation amount) is significantly different between parts with a reinforcing fabric sheet and parts without a reinforcing fabric sheet. Therefore, the reinforcing fabric sheet greatly influences the deployment of the fabric main portions. Therefore, when being deployed, the airbag behaves in a different manner from the above described conventional airbag 102, in which the different reinforcing fabric sheets 105, 106, 110, 112, 113 are provided for reinforcing different parts. As a result, such an airbag may be unable to achieve deployment performance (for example, the speed of deployment) equivalent to that of the conventional airbag 102.

SUMMARY OF THE INVENTION

Accordingly, it is an objective of the present invention to provide a side airbag apparatus that improves the manner in which an airbag is deployed, while improving the reinforcement of the airbag.

To achieve the foregoing objective and in accordance with one aspect of the present invention, a side airbag apparatus for protecting an occupant seated in a seat of a vehicle is provided. The side airbag apparatus includes an airbag, an inflator, and a reinforcing fabric sheet. The airbag is formed by laying a pair of fabric main portions on top of each other in the width direction of the vehicle and joining the fabric main portions to each other at peripheries. The inflator that is located inside and in a rear section of the airbag, the inflator having a gas outlet. In response to an impact from a side applied to the vehicle, the inflator jets inflation gas from the gas outlet, thereby inflating and deploying the airbag toward the front of the vehicle in a space between the occupant seated in the vehicle seat and a body side portion of the vehicle. The reinforcing fabric sheet has a pair of reinforcing fabric portions. The reinforcing fabric portions are laid on the inner surfaces of the fabric main portions. The reinforcing fabric portions extend to a position forward of a center portion of the fabric main portions in a front-rear direction from rear sections of the fabric main portions, which are located outside of the reinforcing fabric portions. Front ends of the reinforcing fabric portions are joined to the fabric main portions by front joint portions. At least one of the reinforcing fabric portions has a hole at a position between the rear end of the reinforcing fabric portion and the front joint portions.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12 is a plan view seen from above showing the airbag module before the airbag in the post-joining spread state is in the process of folding;

FIG. 13(A) is a side view seen from the vehicle outer side showing the airbag module in which the airbag of FIG. 12 has been folded;

FIG. 13(B) is a side view showing the airbag module in which the airbag of FIG. 13(A) has been folded again so as to be in a storage mode;

FIG. 14(A) is a side view seen from the vehicle outer side showing the airbag module, in which the airbag is in the storage mode;

FIGS. 14(B) to 14(D) are diagrams showing the process in which folded back portions of the airbag are unfolded and deployed;

DETAILED DESCRIPTION OF THE PREFERRED EMBODIMENTS

Hereinafter, a side airbag apparatus according to one embodiment of the present invention will be described with reference to FIGS. 1 to 17.

In the following, the direction in which a vehicle advances forward is defined as the front (front of the vehicle), and the reverse direction is defined as the rear (rear of the vehicle). The vertical direction refers to the vertical direction of the vehicle, and the left and right direction refers to the width direction of the vehicle, that is, the left and right direction when the vehicle is driving forward.

Figure 1:
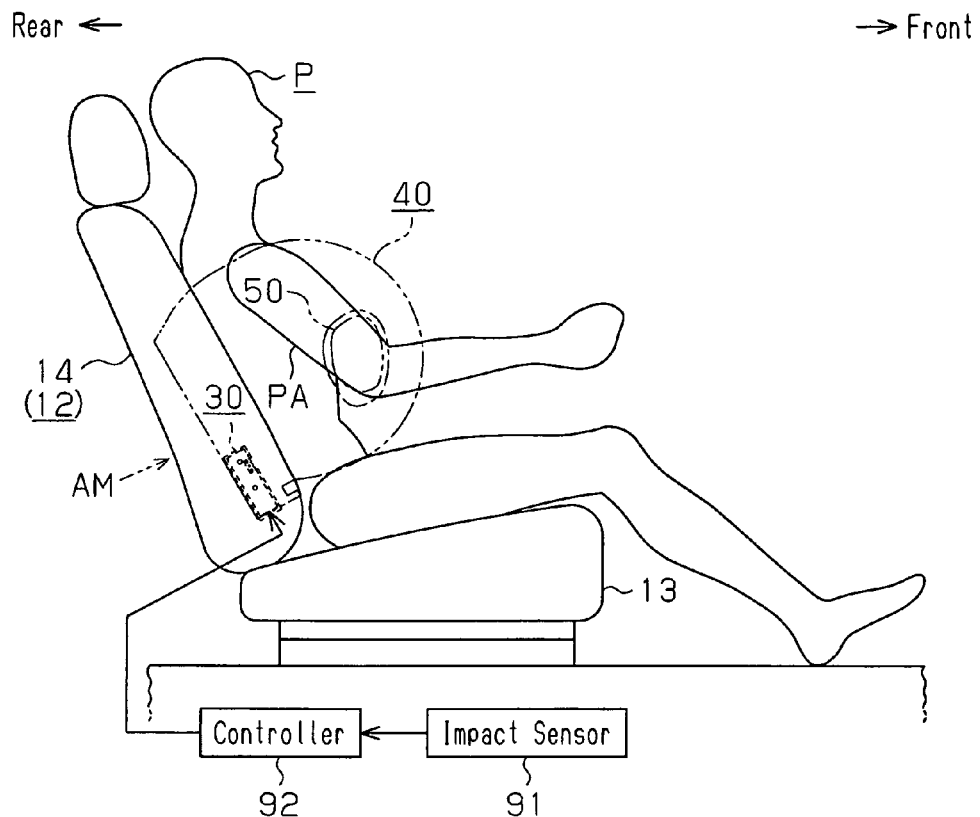
FIG. 1 is a schematic side view illustrating a vehicle seat to which a side airbag apparatus according to one embodiment of the present invention is mounted.
Figure 2:
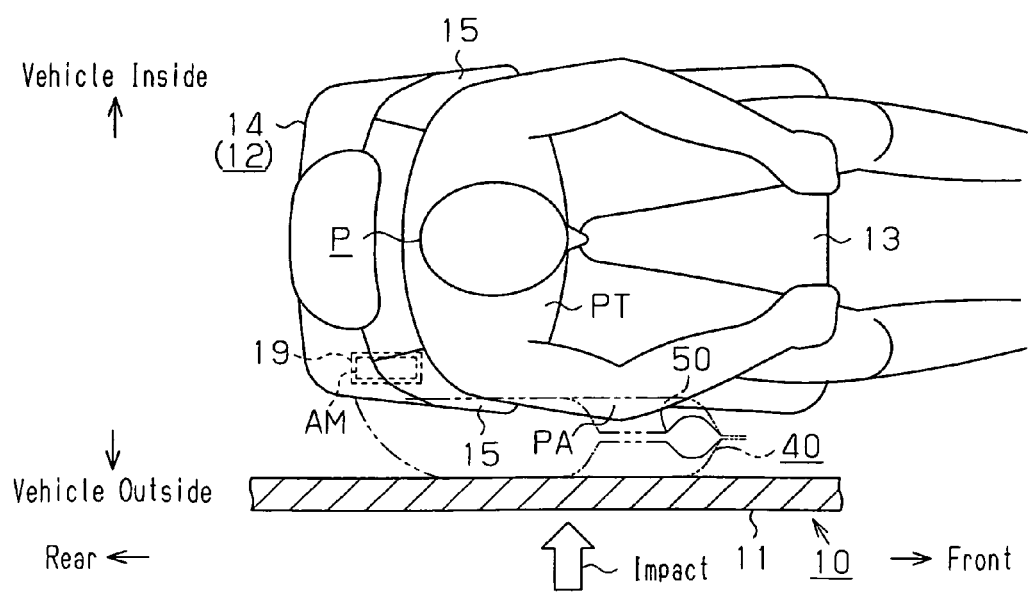
FIG. 2 is a schematic plan view showing, together with an occupant, the vehicle seat of FIG. 1 and a body side portion.
Figure 3:
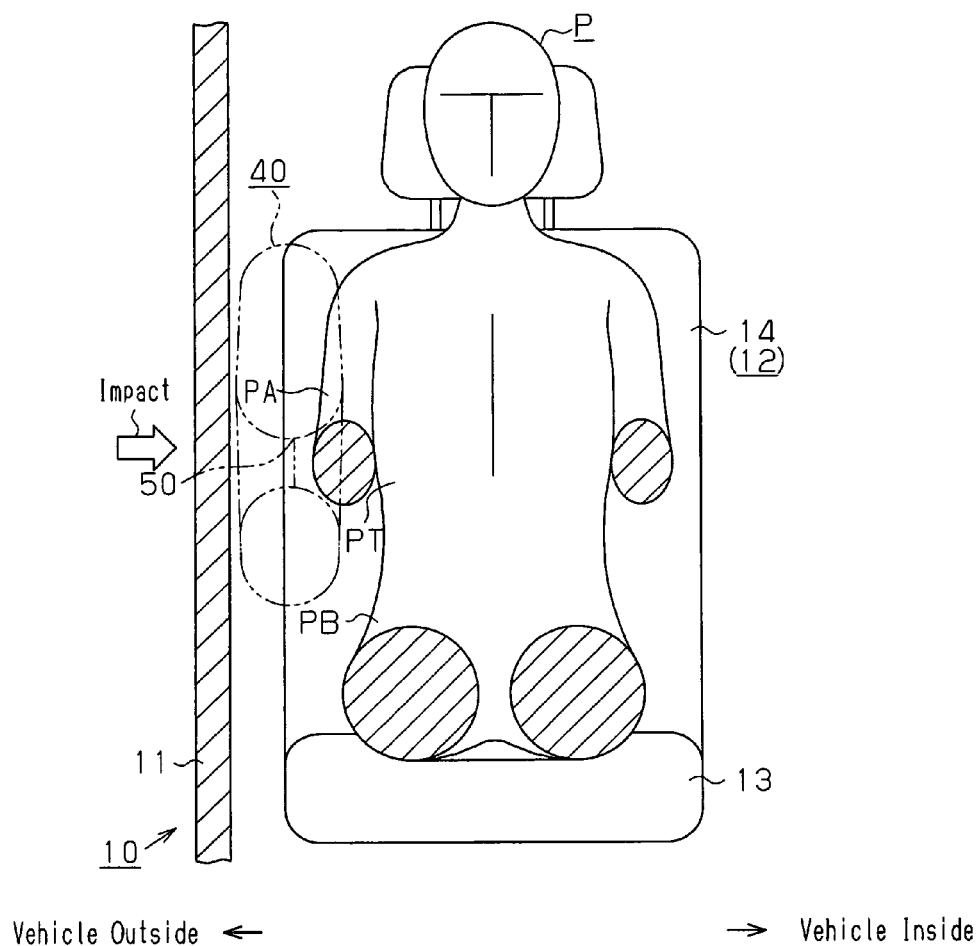
FIG. 3 is a schematic cross-sectional front view showing, together with the occupant, the vehicle seat of FIG. 1 and the body side portion.

As shown in FIGS. 1 to 3, a vehicle seat 12 is arranged on the inner side (upper side as viewed in FIG. 2, right side as viewed in FIG. 3) of a body side portion 11 of a vehicle 10. The body side portion 11 refers to members that are located on a side of the vehicle 10, mainly doors and pillars. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and a rear quarter.

Figure 7:
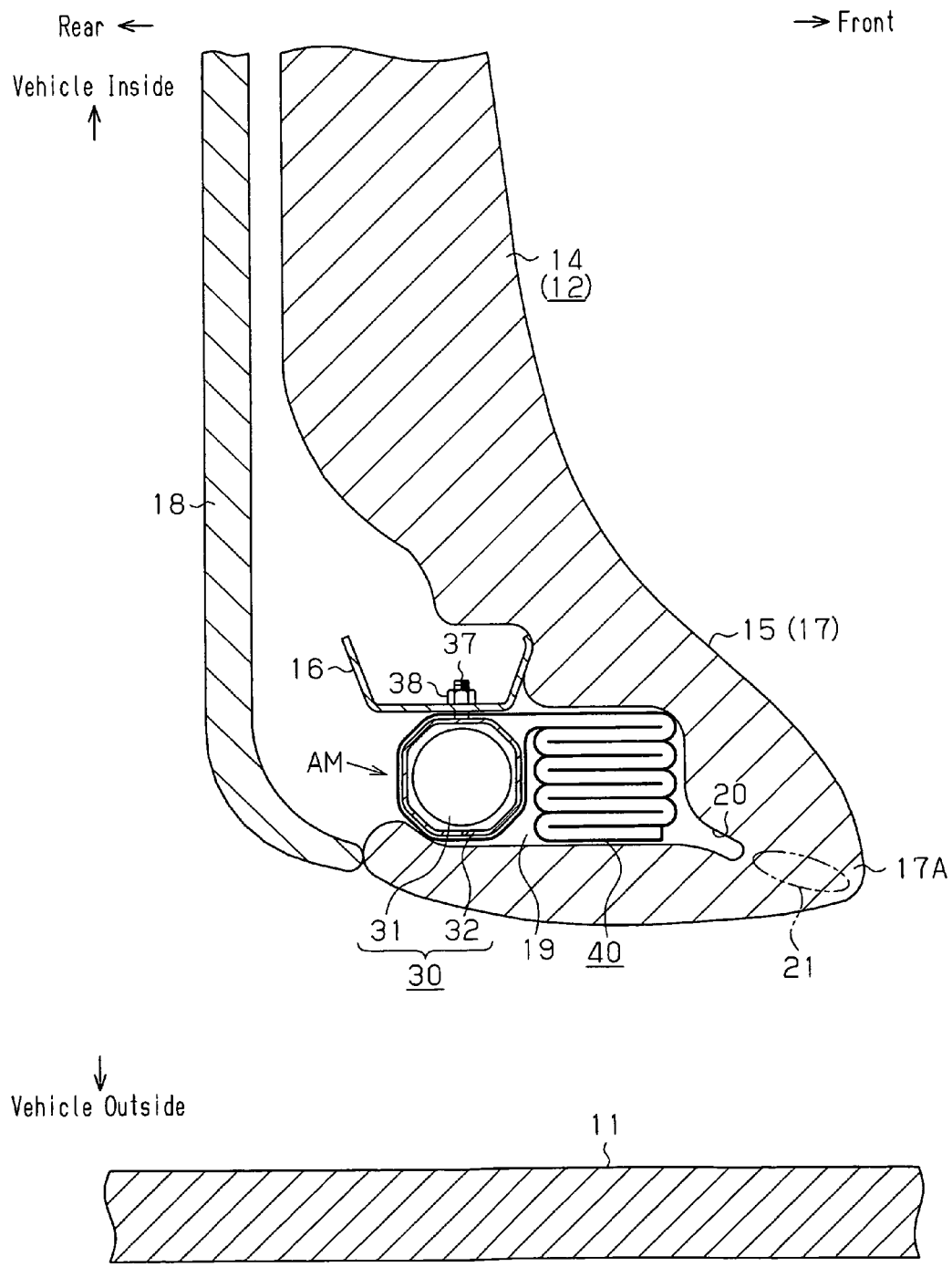
FIG. 7 is a partial cross-sectional plan view showing, together with the body side portion, the airbag module stored in the storage portion of the backrest.
Figure 8:
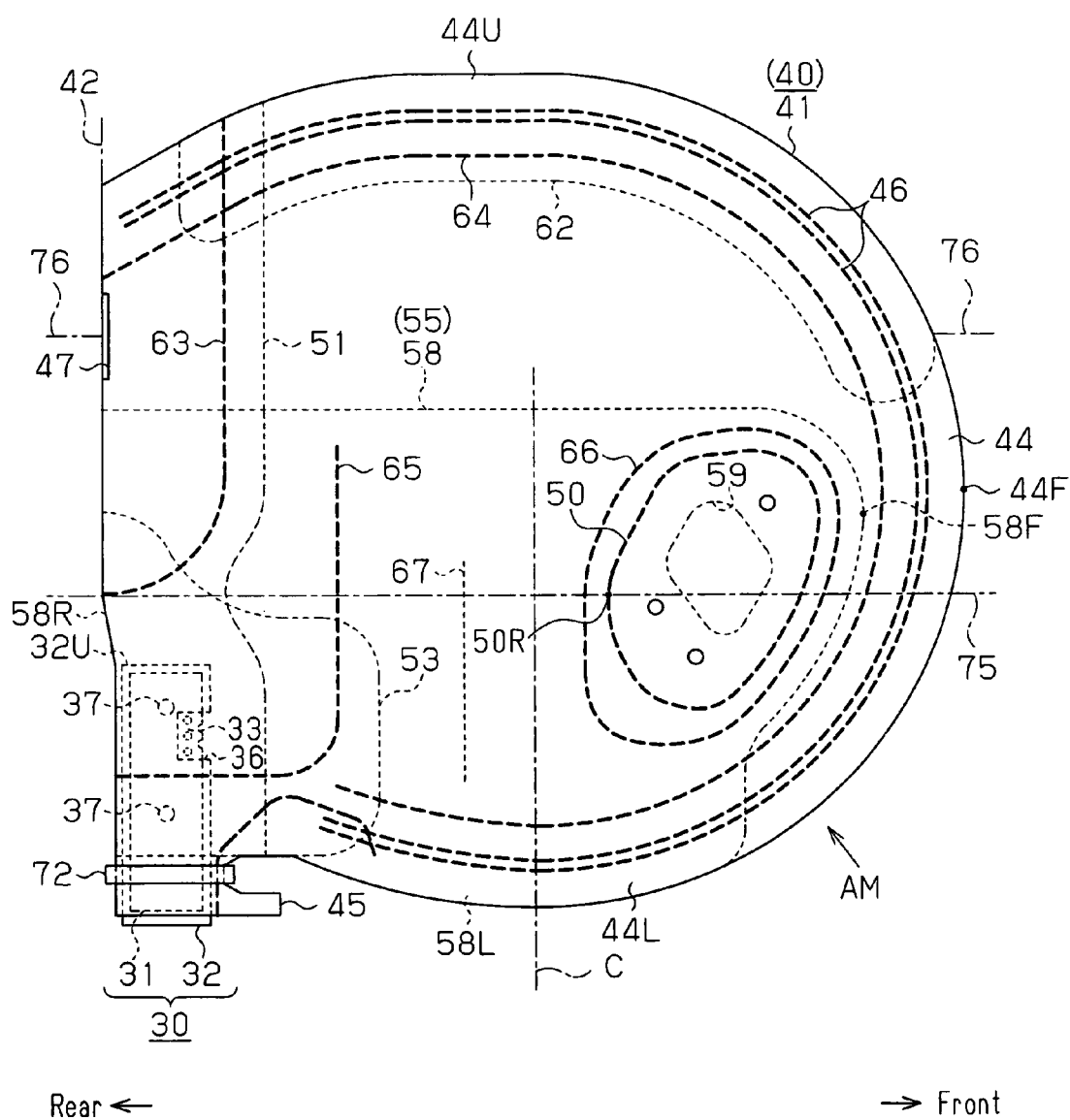
FIG. 8 is a side view seen from the vehicle outer side, showing the airbag module before the airbag in the post-joining spread state is folded up.

The vehicle seat 12 includes a seat cushion 13 and a backrest 14. The backrest 14 extends upward from the rear end of the seat cushion 13 and includes a tilt adjusting mechanism (not shown). As shown in FIGS. 2 and 7, the backrest 14 has side support portions 15 at the front part. The side support portions 15 are located on both sides (upper and lower sides as viewed in FIGS. 2 and 7) of the backrest 14. The side support portions 15 support an occupant P seated on the vehicle seat 12 and leaning against the backrest 14, in such a manner as to limit the movement of the occupant P in the direction of the vehicle width.

Next, the internal structure of a side portion on the vehicle outer side including a side support portion 15 in the backrest 14 will now be described.

The backrest 14 incorporates a seat frame, which serves as a framework. As shown in FIG. 7, a part of the seat frame is located in the side support portion 15 of the backrest 14. A part of the seat frame shown in FIG. 7 (hereinafter, referred to as a side frame portion 16) is formed by bending a metal plate. A seat pad 17, which is made of an elastic material such as urethane foam, is arranged on the front side of the seat frame including the side frame portions 16. A rigid back board 18, which is made of synthetic resin, is arranged on the rear side of the seat frame. The seat pad 17 is covered with a cover sheet (not shown).

An storage portion 19 is provided in the seat pad 17 at a position in the vicinity of the side frame portion 16. More specifically, the storage portion 19 is located on the outer side of the side frame portion 16. The storage portion 19 is located diagonally behind the occupant P seated on the vehicle seat 12. An airbag module AM, which forms a main part of the side impact airbag apparatus, is located in the storage portion 19 accommodates.

A slit 20 extends diagonally forward and outward from the outer and front corner of the storage portion 19. A part between a front corner 17A of the seat pad 17 and the slit 20 forms a breakable portion 21, which is broken by an airbag 40, which will be discussed below.

The airbag module AM includes as its main components an inflator assembly 30 and the airbag 40.

Each of the components will now be described. In the present embodiment, the up-down direction and the front-rear direction of the components of the airbag module AM are defined with reference to the backrest 14 of the vehicle seat 12 as shown in FIG. 1. A direction along which the backrest 14 stands is defined as the up-down direction, and a direction along the thickness of the backrest 14 is defined as the front-rear direction. Since the backrest 14 is slightly inclined rearward in use, the up-down direction is not strictly the vertical direction, but corresponds to a slightly inclined direction. Likewise, the front-rear direction is not strictly a horizontal direction, but corresponds to a slightly inclined direction.

<Inflator Assembly 30>

Figure 4:
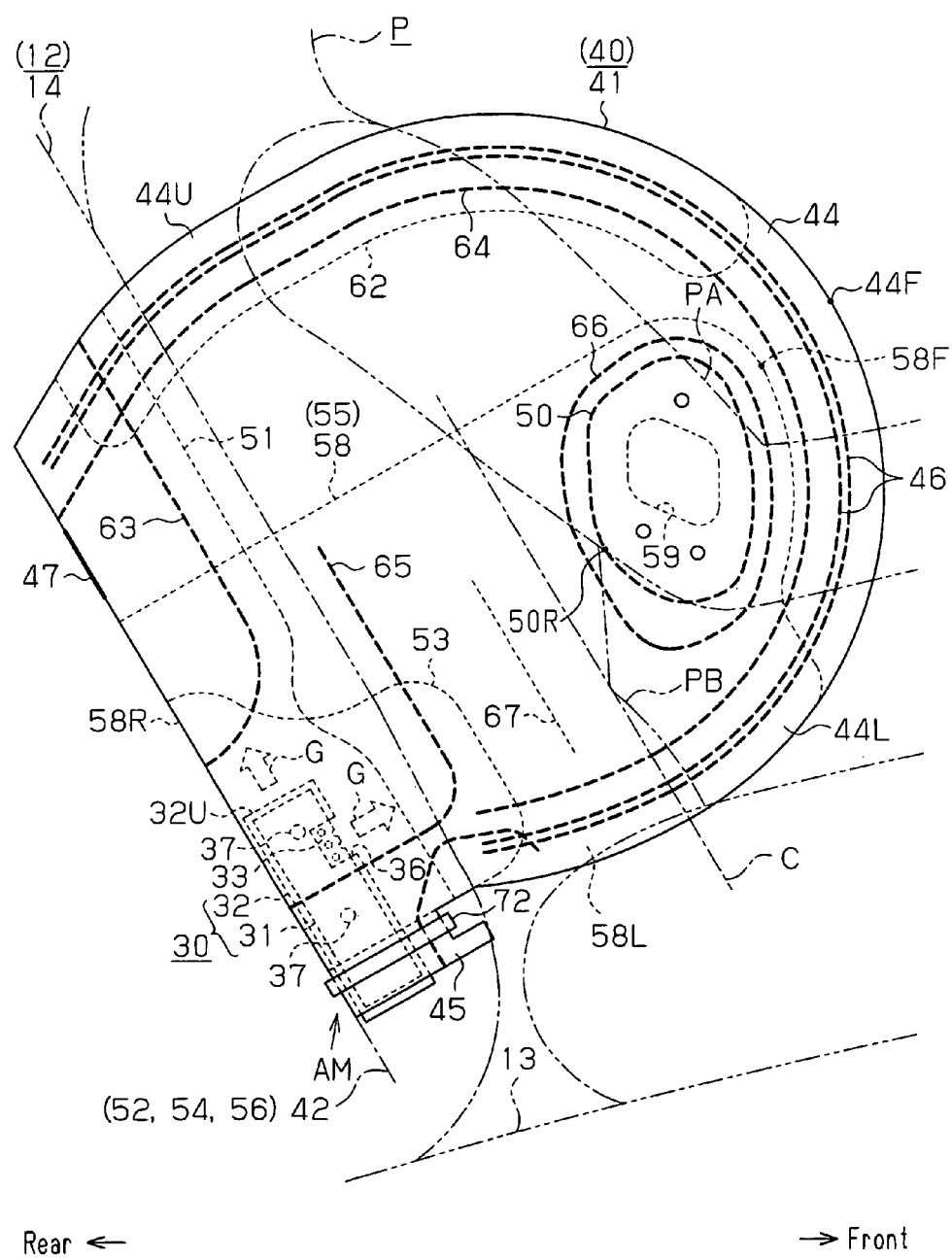
FIG. 4 is a schematic side view showing, together with the occupant, an airbag module having an airbag in a post-joining spread state.
Figure 5:
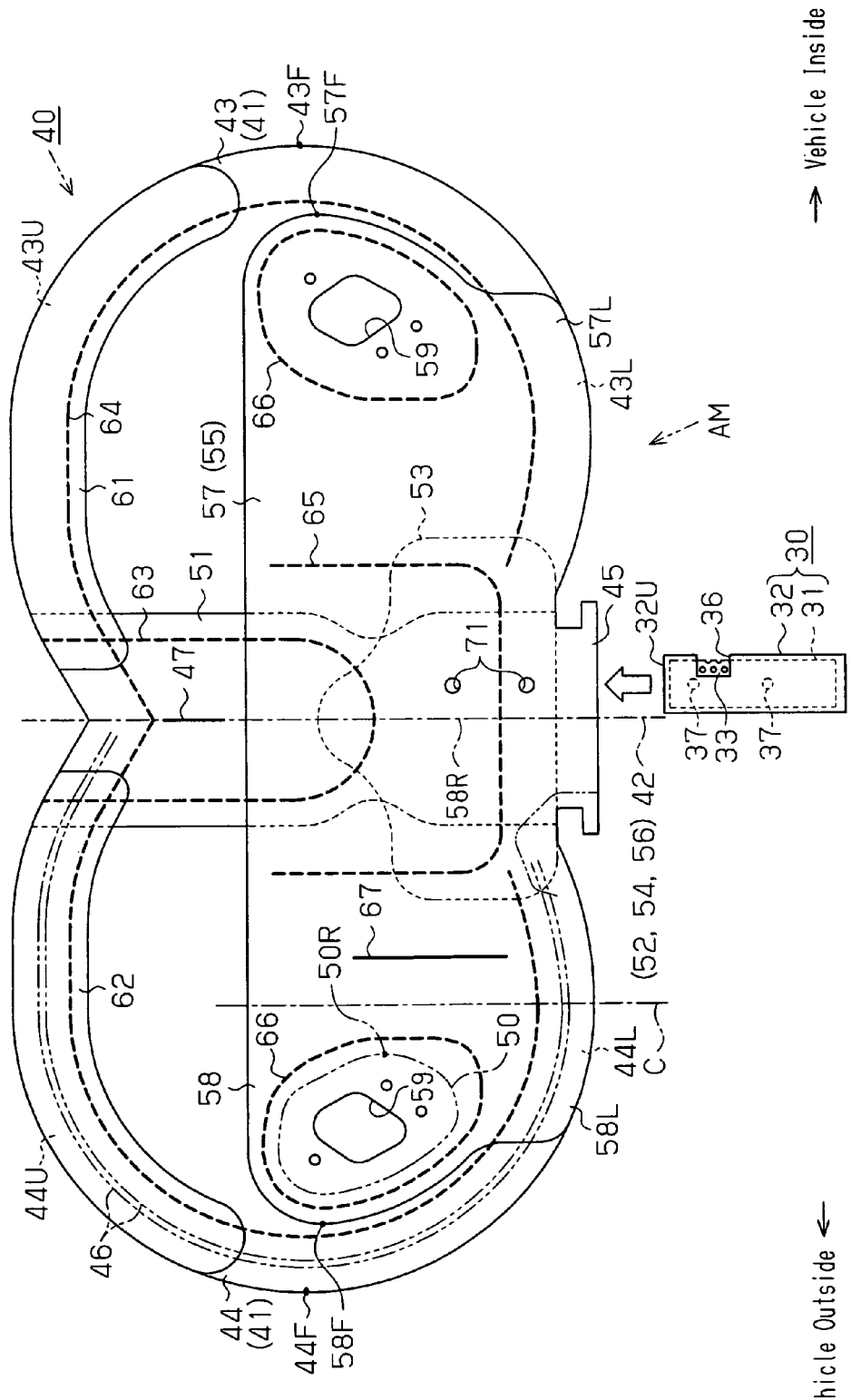
FIG. 5 is a diagram of a state in the production of the airbag module, showing an airbag in a pre-joining spread state, reinforcing fabric sheets, and an inflator assembly.

As shown in FIGS. 4 and 5, the inflator assembly 30 includes a gas source, which is an inflator 31, and a retainer 32 mounted on the outer surface of the inflator 31. In the present embodiment, a pyrotechnic inflator is used as the inflator 31.

The inflator 31 is substantially formed like a long slender column extending in the up-down direction. The inflator 31 contains in it gas generating agent (not shown), which generates inflation gas through chemical reaction accompanied by heat. A gas outlet 33 is formed in an upper section of the inflator 31. The inflation gas G generated by the inflator 31 is jetted radially outward through the gas outlet 33. A harness (not shown), which is wiring for applying control signals to the inflator 31, is connected to a lower end portion of the inflator 31.

In place of the pyrotechnic inflator using the gas generating agent, it is possible to use a hybrid type inflator, which breaks a partition wall of a high-pressure gas cylinder filled with a high-pressure gas by a low explosive so as to jet out gas.

On the other hand, the retainer 32 functions as a diffuser and secures the inflator 31 to the side frame portion 16 in the backrest 14 together with the airbag 40 (see FIG. 7). Most part of the retainer 32 is a plate made of, for example, metal, and is formed into a long slender cylinder extending in the up-down direction through bending. A window 36 for exposing a part of the gas outlet 33 of the inflator 31 is provided in an upper front section of the retainer 32. The upper end of the retainer 32 is open. This configuration allows inflation gas G jetted through the gas outlet 33 to be jetted substantially toward the front of the vehicle 10 through the window 36, and to be jetted substantially upward through an upper opening 32U.

As shown in FIG. 7, the retainer 32 is fixed to the side frame portion 16 with bolts 37 serving as fixing members (in the present embodiment, the number of the bolts 37 is two). In other words, the inflator 31 is indirectly fixed by the bolts 37 with the retainer 32. The bolts 37 extend in a direction perpendicular to the axis of the inflator 31.

The inflator 31 and the retainer 32 of the inflator assembly 30 may be formed integrally.

<Airbag 40>

Figure 6:
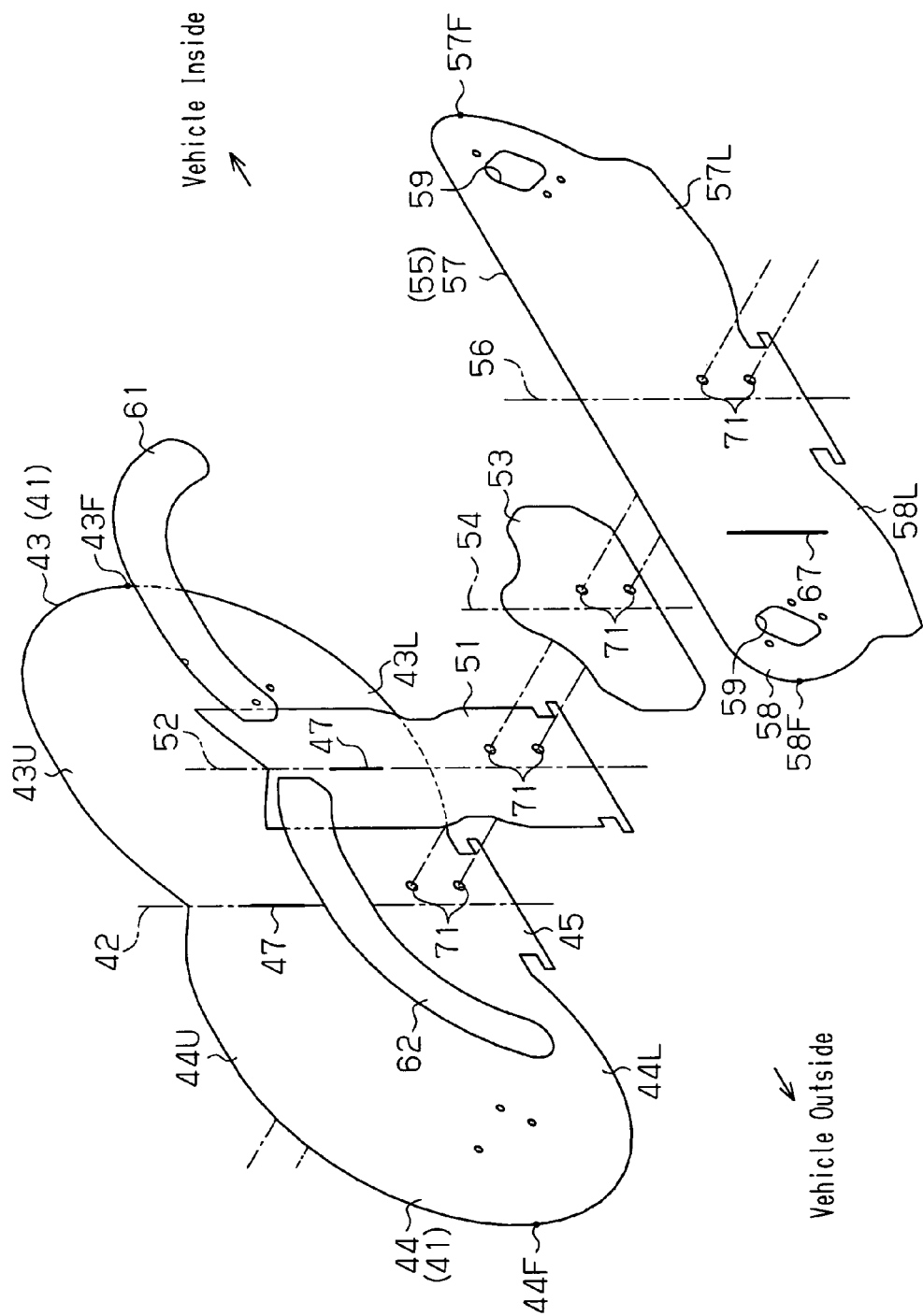
FIG. 6 is an exploded perspective view showing a state before reinforcing fabric sheets are joined to the airbag in the pre-joining spread state.

As shown in FIGS. 1 to 3, the airbag 40 is designed for protecting the occupant P seated in the vehicle seat 12. When an impact is applied to the body side portion 11 of the vehicle 10 due to a side collision, the airbag 40 is inflated and deployed by the inflation gas G from the inflator 31. The airbag 40 pops out substantially forward with a part thereof (rear section) remaining in the storage portion 19, and is inflated and deployed between the occupant P and the body side portion 11. The airbag 40 thus restrains the occupant P, thereby protecting him/her from the impact FIG. 4 schematically shows the airbag module AM in a state where the airbag 40 is spread without being filled with the inflation gas G (post-joining spread state). FIGS. 5 and 6 show a state of the production of the airbag module AM. As shown in FIGS. 4 to 6, the airbag 40 is formed by a fabric panel 41, which is a single fabric sheet. That is, the airbag 40 is formed by folding back the fabric panel 41 in half in the width direction of the vehicle along a fold line 42 defined in a center portion, and joining the overlapped portions. To distinguish the two overlapped portions of the airbag 40, a part located on the vehicle inner side will be referred to as an inner fabric main portion 43, and a part located on the vehicle outer side will be referred to as an outer fabric main portion 44. In the airbag 40, the outer shapes of the inner and outer fabric main portions 43, 44 are symmetrical with respect to the fold line 42 as the axis of symmetry. The outer shape of the overlapped and joined airbag 40 defines a straight line at the rear edge, and a gentle arc at a most part of the periphery (see FIG. 4).

As the material for the fabric panel 41, a material that has a high strength and flexibility and is easy to fold is preferable.

For example, woven fabric made of polyester threads or polyamide threads is suitable. "Non-coated fabric" having no heat resistant coating of silicone is used for the fabric panel 41. The inner and outer fabric main portions 43, 44 have such size and shape that, when the airbag 40 is inflated and deployed, it can protect the thorax PT (refer to FIGS. 2 and 3) of the occupant P seated in the vehicle seat 12.

The fabric panel 41 is formed such that an attachment portion 45, to which a part (lower section) of the inflator assembly 30 is attached, projects downward. That is, in the airbag 40, which is formed by folding the fabric panel 41 in half to lay the fabric main portions 43, 44 on top of each other, the attachment portion 45 is also folded back on itself at the center along the fold line 42. The attachment portion 45 is used to fasten of the inflator assembly 30.

Joining of the inner fabric main portion 43 and the outer fabric main portion 44 is carried out at a main peripheral joint portion 46 provided in the peripheries of the fabric main portions 43, 44. In the present embodiment, the main peripheral joint portion 46 is formed by sewing most of the peripheries of the fabric main portions 43, 44 with sewing threads except the rear edges. The main peripheral joint portion 46 is represented by thick broken line in FIG. 4. In FIG. 5, the main peripheral joint portion 46 is represented by alternate long and two short dashes lines only on the outer fabric main portion 44. A space between the fabric main portions 43, 44 surrounded by the main peripheral joint portion 46 serves as a protecting region for protecting, for example, the thorax PT of the occupant P from an impact.

The airbag 40 may be formed by a pair of independent panels. In this case, the pair of fabric panels are laid on top of each other in the direction of the width of the vehicle. The fabric panel located on the vehicle inner side corresponds to the fabric main portion 43, and the fabric panel located on the vehicle outer side corresponds to the fabric main portion 44. The fabric main portions 43, 44 are joined to each other to form the airbag 40. The main peripheral joint portion 46 may be formed by method other than sewing using sewing threads as shown above, but may be formed by, for example, using an adhesive.

In a case where the main peripheral joint portion 46 is formed by sewing threads, the main peripheral joint portion 46 may be formed by a single row or multiple rows of sewing threads. In the present embodiment, the main peripheral joint portion 46 is formed by two rows of sewing threads.

A vent hole 47 for discharging the inflation gas G in the airbag 40 to the outside is formed in a rear upper section of the folded and overlapped fabric main portions 43, 44. In the present embodiment, the vent hole 47 is formed as a slit that extends in the up-down direction along the fold line 42 of the airbag 40. The position, shape, and number of the vent hole 47 may be changed as necessary.

When in the post-joining spread state, the airbag 40 has an internal joining portion that joins the fabric main portions 43, 44 to each other at a position forward of a center C in the front-rear direction, after bringing the fabric main portions 43, 44 close to each other. In the present embodiment, an inflation limiting portion 50 is provided as the internal joining portion. The inflation limiting portion 50 is located in the airbag 40 in the post-joining spread state at a position that corresponds to the arm PA of the occupant P. The inflation limiting portion 50 limits the thickness of the airbag 40 in the vehicle width direction at a position corresponding to the arm PA, thereby preventing the arm PA from being strongly pushed inward along the vehicle width direction by the airbag 40. The inflation limiting portion 50 is formed by sewing at least the fabric main portions 43, 44 in a loop shaped area (in the present embodiment, in a substantially rectangular loop) with sewing threads. The reason why the expression "at least the fabric main portions 43, 44" is used is that a third reinforcing fabric sheet 55 (more specifically, a pair of reinforcing fabric portions 57, 58) located between the fabric main portions 43, 44 is also sewn. The position of the inflation limiting portion 50 corresponds to the side of the arm PA when an adult occupant P having a normal built is sitting in the vehicle seat 12 in a normal position. The normal position refers to, for example, the position of a driver, or the occupant P, when holding the steering wheel.

Rear sections of the fabric main portions 43, 44 close to the gas outlet 33 are parts to be reinforced. To reduce the influence of heat and pressure of the inflation gas G on the parts to be reinforced, a single first reinforcing fabric sheet 51 is provided in a rear section of the airbag 40. The first reinforcing fabric sheet 51 is folded in half in the direction of the vehicle width along a fold line 52. The first reinforcing fabric sheet 51 is formed of coated fabric. The coated fabric mainly contains fabric that has high strength as the fabric panel 41 and flexibility so as to be easily folded. The surface of the fabric is coated with heat resistant coating layer made of elastomer such as chloroprene and silicone. Second to fifth reinforcing fabric sheets 53, 55, 61, 62, which will be discussed below, are made of the same material as the first reinforcing fabric sheet 51.

One of the reasons why non-coated fabric is used for the fabric panel 41 forming the airbag 40 and coated fabric is used for the first to fifth reinforcing fabric sheets 51, 53, 55, 61, 62, is to reduce the amount of coated fabric in the airbag module AM, thereby preventing the costs from being increased by the use of coated fabric.

A state of the airbag 40 in which the fabric main portions 43, 44 before being folded in half are spread to be flat is defined as a pre-joining spread state of the airbag 40. Also, a state of the first reinforcing fabric sheet 51 in which it is spread flat before being folded in half is defined as a pre-joining spread state of the first reinforcing fabric sheet 51. When in the pre-joining spread state, the first reinforcing fabric sheet 51 has a narrow width and is long slender along the up-down direction. Also, when in the pre-joining spread state, the first reinforcing fabric sheet 51 is laid on top of the airbag 40, with its fold line 52 matching with the fold line 42 of the airbag 40 in the pre-joining spread state. In this state, the upper edge of the first reinforcing fabric sheet 51 matches with the upper edge of the airbag 40, and the lower edge of the first reinforcing fabric sheet 51 matches with the lower edge of the airbag 40.

The single second reinforcing fabric sheet 53 is provided as a portion to be reinforced at rear lower portions of the fabric main portion 43, 44. To reduce the influence of heat and pressure of the inflation gas G on this part to be reinforced, the second reinforcing fabric sheet 53 is provided in a lower rear section of the airbag 40. The second reinforcing fabric sheet 53 is folded in half in the vehicle width direction along a fold line 54 defined thereon. A state of the second reinforcing fabric sheet 53 in which it is spread flat before being folded in half is defined as a pre-joining spread state of the second reinforcing fabric sheet 53. The second reinforcing fabric sheet 53 in the pre-joining spread state has a greater width and lower height in the up-down direction than the first reinforcing fabric sheet 51 in the pre-joining spread state. Also, when in the pre-joining spread state, the second reinforcing fabric sheet 53 is laid on top of a lower section of the airbag 40 and a lower section of the first reinforcing fabric sheet 51, with its fold line 54 matching with the fold lines 42, 52 of the airbag 40 and the first reinforcing fabric sheet 51 each in the pre-joining spread state. In this state, the lower edge of the second reinforcing fabric sheet 53 matches with the lower edges of the airbag 40 and the first reinforcing fabric sheet 51.

The single third reinforcing fabric sheet 55 is provided to protect rear and front sections of the fabric main portion 43, 44. To reduce the influence of heat and pressure of the inflation gas G on these parts to be reinforced, the third reinforcing fabric sheet 55 is provided in a lower half of the airbag 40. The third reinforcing fabric sheet 55 is folded in half in the vehicle width direction along a fold line 56 defined thereon. The third reinforcing fabric sheet 55 corresponds to the reinforcing fabric sheet in CLAIMS. The rear sections of the fabric main portions 43, 44 laid on top of each other in the vehicle width direction are located in the vicinity of the gas outlet 33 of the inflator 31. The front sections of the fabric main portions 43, 44 are positions at which the inflation limiting portion 50 is provided. The lower half mentioned above refers to a region below a center in the up-down direction. The lower half includes the lower edges of the fabric main portions 43, 44.

To distinguish the two folded-in-half portions of the third reinforcing fabric sheet 55, a part located on the vehicle inner side will be referred to as a reinforcing fabric portion 57, and a part located on the vehicle outer side will be referred to as a reinforcing fabric portion 58. In the third reinforcing fabric sheet 55, the reinforcing fabric portions 57, 58 are symmetrical with respect to a fold line 56 as the axis of symmetry.

The upper edge of the third reinforcing fabric sheet 55, which is folded in the vehicle width direction, is formed to linearly extend in the front-rear direction. A part of the lower edge of the third reinforcing fabric sheet 55 is formed to have an arcuate shape so as to correspond particularly to the outer shape of the lower edge of the airbag 40. Front ends 57F, 58F of the reinforcing fabric portions 57, 58, which are laid on top of each other in the vehicle width direction, are located rearward of and in the vicinity of the fabric main portions 43, 44, which are similarly laid on top of each other in the vehicle width direction. Therefore, the reinforcing fabric portions 57, 58 extend to a position forward of the center portion C of the fabric main portions 43, 44 in the front-rear direction from the rear ends of the fabric main portions 43, 44, which are located outside of the reinforcing fabric portions 57, 58. The positions of the front ends 57F, 58F of the reinforcing fabric portions 57, 58 are slightly forward of the inflation limiting portion 50. Parts that are in front sections of the reinforcing fabric portions 57, 58 and surrounded by the inflation limiting portion 50 are cut out. The cut-out portions 59 minimizes the thickness of the regions in the reinforcing fabric portions 57, 58 surrounded by the inflation limiting portion 50. This enhances the arm pushing preventing effect of the inflation limiting portion 50.

Also, a state of the third reinforcing fabric sheet 55 in which it is spread flat before being folded in half is defined as a pre-joining spread state of the third reinforcing fabric sheet 55. The width of the third reinforcing fabric sheet 55 in the pre-joining spread state is greater than the widths of the first and second reinforcing fabric sheets 51, 53 in the pre-joining spread state and is slightly smaller than the width of the airbag 40 in the pre-joining spread state. The third reinforcing fabric sheet 55 in the pre-joining spread state is shorter in the up-down direction than the first reinforcing fabric sheet 51 in the pre-joining spread state, and longer in the up-down direction than the second reinforcing fabric sheet 53 in the pre-joining spread state.

The third reinforcing fabric sheet 55 in the pre-joining spread state is laid on top of the lower half of the airbag 40, the lower half of the first reinforcing fabric sheet 51, and the second reinforcing fabric sheet 53. At this time, the fold line 56 of the third reinforcing fabric sheet 55 matches with the fold lines 42, 52, 54 of the airbag 40 and the first and second reinforcing fabric sheets 51, 53 in the pre-joining spread state. In this state, the lower edge of the third reinforcing fabric sheet 55 matches with the lower edges of the airbag 40 and the first and second reinforcing fabric sheets 51, 53.

Therefore, the first to third reinforcing fabric sheets 51, 53, 55 are laid on top of a region below a center portion in the width direction of the airbag 40 in the pre-joining spread state.

As described above, the third reinforcing fabric sheet 55 reinforces front and rear two positions of the fabric main portions 43, 44 that are laid on top of each other in the vehicle width direction. Thus, at the production of the side airbag apparatus, when the reinforcing fabric portions 57, 58 in the pre-joining spread state are arranged on predetermined positions of the fabric main portions 43, 44 in the pre-joining spread state, the third reinforcing fabric sheet 55 is arranged on the two positions to be reinforced simultaneously.

The fourth reinforcing fabric sheet 61 and the fifth reinforcing fabric sheet 62 reinforce upper halves of the peripheries of the fabric main portions 43, 44, respectively. To reduce the influence of heat and pressure of the inflation gas G on these parts to be reinforced, the fourth and fifth reinforcing fabric sheets 61, 62 are provided in upper sections 43U, 44U of the peripheries of the fabric main portions 43, 44. The fourth and fifth reinforcing fabric sheets 61, 62 are formed to be arcuate so as to correspond to the outer shapes of the fabric main portions 43, 44. The front ends of the reinforcing fabric sheets 61, 62 are located in the vicinity of the front ends 43F, 44F of the fabric main portions 43, 44, which are laid on top of each other in the vehicle width direction. The rear ends of the reinforcing fabric sheets 61, 62 are located in the vicinity of the fold line 42. More specifically, the rear ends of the reinforcing fabric sheets 61, 62 are located rearward of the front end of the first reinforcing fabric sheet 51. Unlike the above described first to third reinforcing fabric sheets 51, 53, 55, the reinforcing fabric sheets 61, 62 are not folded in half. The entire fourth reinforcing fabric sheet 61 is laid on top of the upper section 43U of the periphery of the inner fabric main portion 43, and a part of the fourth reinforcing fabric sheet 61 is laid on top of the upper end of the first reinforcing fabric sheet 51. The entire fifth reinforcing fabric sheet 62 is laid on top of the upper section 44U of the periphery of the outer fabric main portion 44, and a part of the fifth reinforcing fabric sheet 62 is laid on top of the upper end of the first reinforcing fabric sheet 51.

The first to fifth reinforcing fabric sheets 51, 53, 55, 61, 62 are joined to the airbag 40 by a substantially U-shaped upper rear joint portion 63, which is located in a center in the width direction of the airbag 40 in the pre-joining spread state and substantially in an upper section. The first to fifth reinforcing fabric sheets 51, 53, 55, 61, 62 are joined to the airbag 40 by a substantially arcuate auxiliary peripheral joint portion 64, which is located in the periphery of the airbag 40 in the pre-joining spread state. The first to third reinforcing fabric sheets 51, 53, 55 are joined to the airbag 40 by a substantially U-shaped lower rear joint portion 65, which is located in a center in the width direction of the airbag 40 in the pre-joining spread state and substantially in a lower section. Further, the third reinforcing fabric sheet 55 in the pre-joining spread state is joined to the fabric main portions 43, 44 by a pair of front joint portions 66 located on the sides in the width direction. Each front joint portion 66 is a loop that surrounds the inflation limiting portion 50. The sides in the width direction are positions corresponding to the inflation limiting portion 50. When each side in the width direction of the third reinforcing fabric sheet 55 in the pre-joining spread state is joined to the airbag 40 by the corresponding front joint portion 66, the third reinforcing fabric sheet 55 is joined to the airbag 40 at a position in the vicinity of (around) the inflation limiting portion 50.

The upper rear joint portion 63, the auxiliary peripheral joint portion 64, the lower rear joint portion 65, and the front joint portion 66 are formed by sewing the first to fifth reinforcing fabric sheets 51, 53, 55, 61, 62 to the airbag 40 with sewing threads, and are shown by thick broken lines in FIGS. 4 and 5. At sewing, upper threads and lower threads are crossed. At least either the upper threads or the lower threads have a lower strength against heat and pressure of the inflation gas G than the sewing threads of the above described main peripheral joint portion 46 and the inflation limiting portion 50. This is because the upper rear joint portion 63, the auxiliary peripheral joint portion 64, the lower rear joint portion 65, and the front joint portion 66 are only required to connect the first to fifth reinforcing fabric sheets 51, 53, 55, 61, 62 to the fabric panel 41, but not required to withstand heat and pressure of the inflation gas G.

The upper rear joint portion 63, the auxiliary peripheral joint portion 64, the lower rear joint portion 65, and the front joint portion 66 may be formed by method other than sewing using sewing threads as shown above, but may be formed by, for example, using adhesive.

The outer reinforcing fabric portion 57 has a hole 67 in a part between the lower rear joint portion 65 and the front joint portion 66. In the outer fabric main portion 44, this portion is hard to stretch and inflate due to the influence of the long slender reinforcing fabric portion 57, which extends in the front-rear direction. This portion is located forward of a rear end 58R of the outer reinforcing fabric portion 58. In the present embodiment, a single cut is made in the outer reinforcing fabric portion 58 to form the hole 67. The hole 67 is formed as a slit extending linearly along the up-down direction. When the airbag 40 is inflated and deployed toward the front of the vehicle, the hole 67 is deformed to be spread forward, thereby reducing the resistance of the fabric main portion 44 against stretch and inflation.

Bolt insertion holes 71 are formed in the inner fabric main portion 43 at two positions separated along the up-down direction in the vicinity of the fold line 42. Also, other bolt insertion holes 71 are formed at positions in the first to third reinforcing fabric sheets 51, 53, 55 that correspond to the bolt insertion holes 71 of the fabric main portion 43.

As described above, the fabric main portions 43, 44 are folded in half along the fold line 42 and laid on top of each other, and joined to each other at the main peripheral joint portion 46 and the inflation limiting portion 50. The main peripheral joint portion 46 integrally joins not only the fabric main portions 43, 44, but also the first to fifth reinforcing fabric sheets 51, 53, 55, 61, 62 located between the fabric main portions 43, 44. The inflation limiting portion 50 integrally joins not only the fabric main portions 43, 44, but also the reinforcing fabric portions 57, 58 located between the fabric main portions 43, 44.

As shown in FIG. 4, the inflator assembly 30 is arranged in the airbag 40 at a lower rear section, so as to extend substantially in the up-down direction. The two bolts 37 the retainer 32 are passed through the above described bolt insertion holes 71 (see FIG. 6). The insertion of the bolts 37 secures the inflator assembly 30, while determining the position of the inflator assembly 30 with respect to the airbag 40. An annular fastening member 72 is swaged so that the attachment portion 45 at the rear lower end of the airbag 40 is hermitically fastened to the lower section of the inflator assembly 30.

By folding the airbag 40 in the post-joining spread state in the following manner, the airbag module AM is made into a compact form (storage mode). In the folding process, a straight mountain fold line 75 and a straight valley fold line 76 extending in the front-rear direction of the vehicle are defined on the airbag 40 in the post-joining spread state are formed. The mountain fold line 75 is set in a lower section of the fabric main portion 44, and the valley fold line 76 is set in an upper section of the fabric main portion 43. In the airbag 40 in the post-joining spread state, the inflator assembly 30 is located in a region below the mountain fold line 75. Also, in the airbag 40 in the post-joining spread state, the vent hole 47 is provided at a position relatively away from the inflator assembly 30. In the present embodiment, a part of the vent hole 47 is located in an area between the valley fold line 76 and the mountain fold line 75. However, the entire vent hole 47 may be located above the valley fold line 76.

Figure 9:
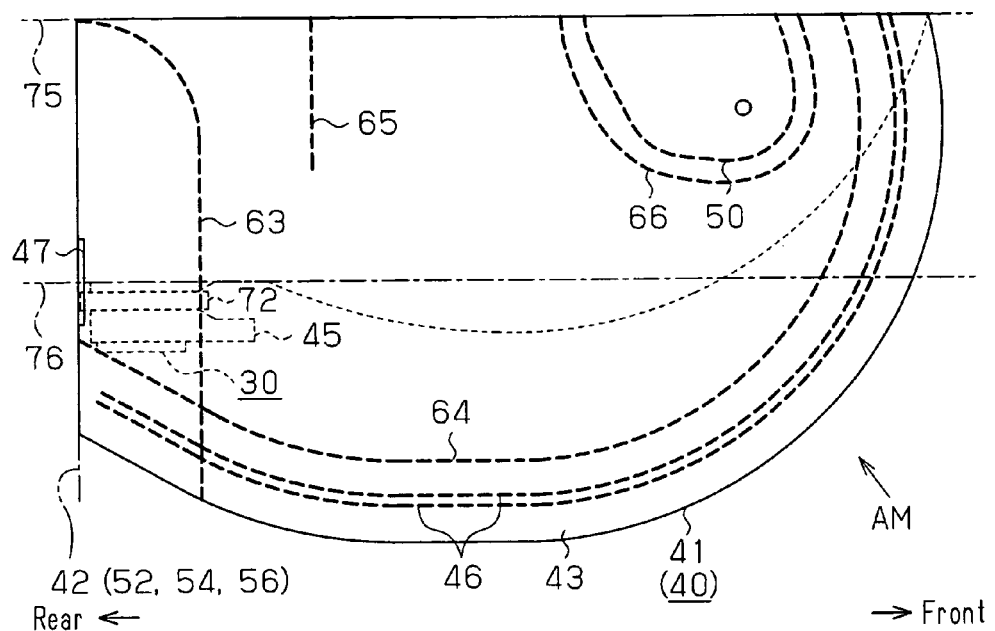
FIG. 9 is a side view seen from the vehicle outer side, showing the airbag module before the airbag in the post-joining spread state is in the process of folding.
Figure 10:
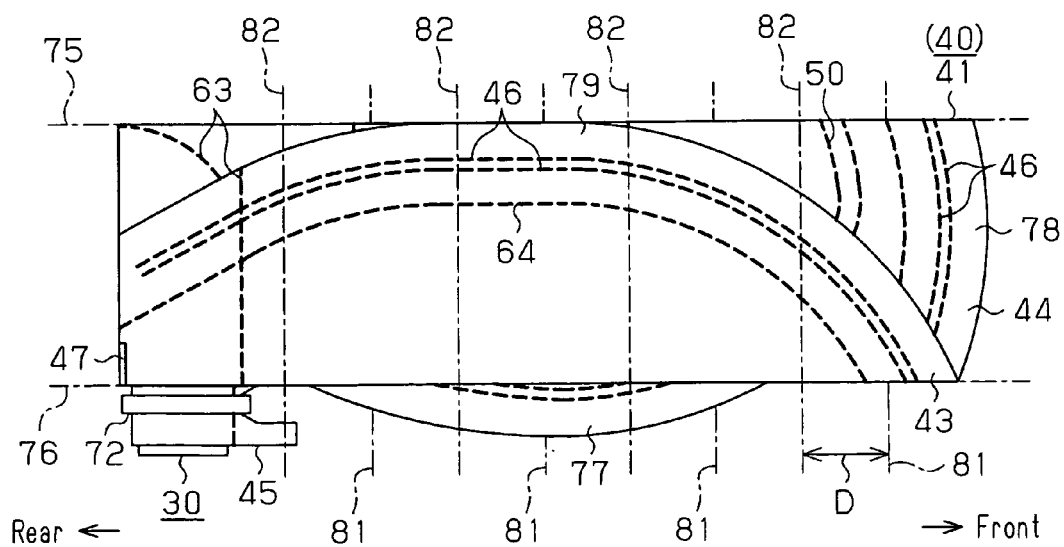
FIG. 10 is a side view showing a state where the airbag shown in FIG. 9 is further folded.
Figure 11:
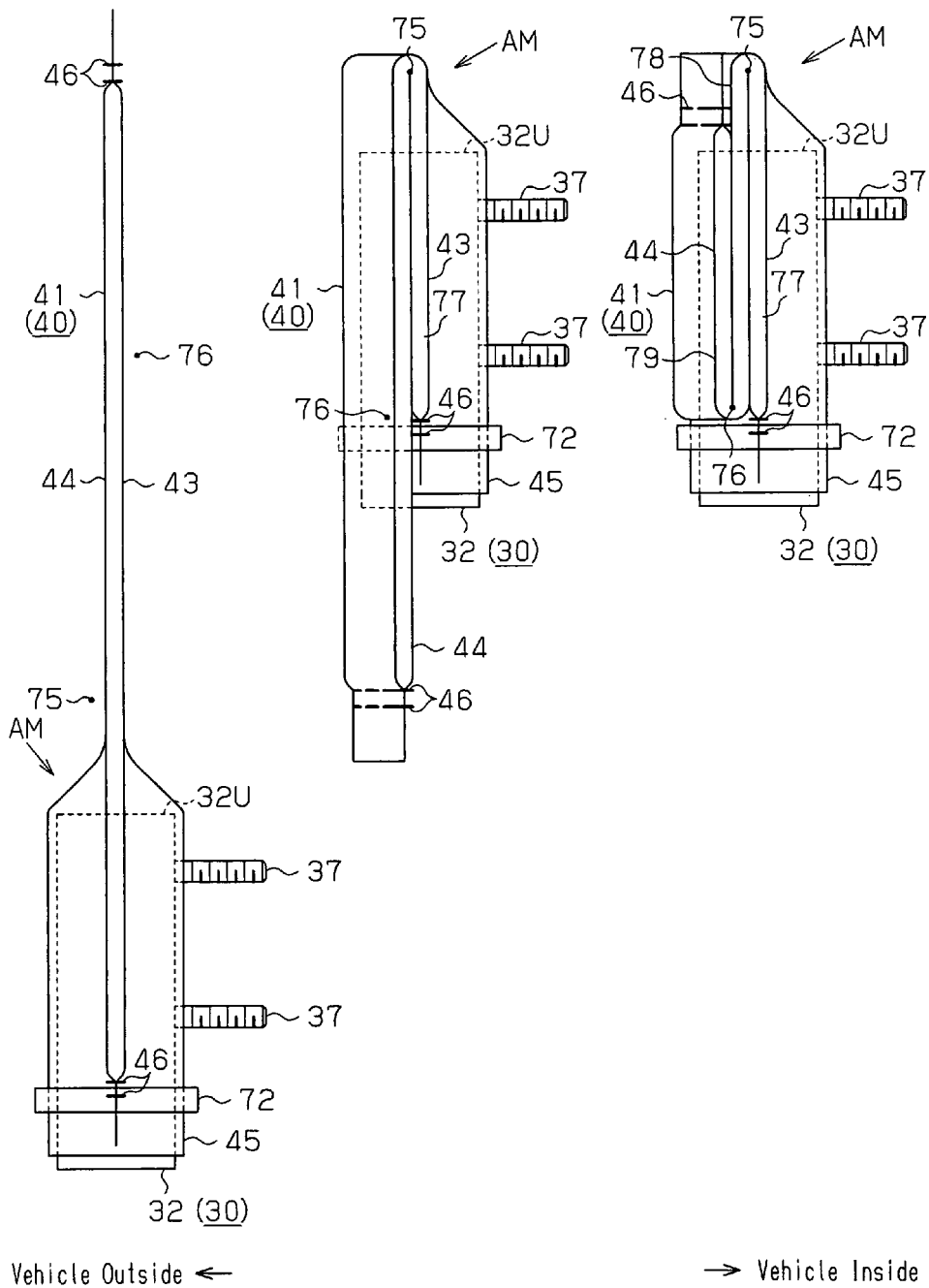
FIG. 11(A) is a front view seen from the front showing the airbag module before the airbag in the post-joining spread state is folded up.
FIG. 11(B) is a front view showing the airbag module in which the airbag of FIG. 11(A) has been folded once.
FIG. 11(C) is a front view showing the airbag module in which the airbag shown in FIG. 11(B) has been folded one more time.

In the airbag 40 in the post-joining spread state, a part above the mountain fold line 75 is folded back toward the vehicle outer side (toward the viewer of the sheet of FIG. 9), along the mountain fold line 75. Further, a part below (above, in FIG. 8) the valley fold line 76 of the airbag 40 shown in FIG. 9 is folded back toward the vehicle outer side along the valley fold line 76 as shown in FIG. 10.

By being folded in the above described manner, the airbag 40 is in a transition form to be made into a form suitable for storage. As shown in FIGS. 10 and 11(C), the transition form is a long slender rectangle extending in the front-rear direction of the vehicle.

The airbag 40 is folded back twice toward the inflator assembly 30 from the end at which the vent hole 47 is provided (upper end), so as to have three layers of folded-back portions 77, 78, 79.

Next, the airbag 40 in the transition form is folded from the front end toward the rear section. Here, the bellows-like folding is carried out. At the bellows-like folding process, mountain fold lines 81 and valley fold lines 82 extending in the up-down direction are set in the airbag 40 in the transition form (see FIG. 10). The intervals between the mountain fold lines 81 and the valley fold lines 82 are set equal to a folding width D of the bellows-like folding process. The airbag 40 is repeatedly folded back by the folding width D while alternately changing the folding direction, along the mountain fold lines 81 and the valley fold lines 82, from the front end to the rear end in FIG. 12.

As described above, the airbag 40 is folded in two directions (the up-down direction and the front-rear direction), so that the airbag module AM becomes compact as shown in FIG. 13(A). Further, when a lower section 83 of the airbag 40, which has been folded by the folding width D is folded upward and toward the vehicle outer side along a fold line 84 extending in the front-rear direction, the airbag module AM is made to be in the storage mode as shown in FIG. 13(B). The airbag module AM is bound by binding tapes (not shown) at several positions as necessary, so as to maintain the storage mode.

The above described airbag module AM is stored in the storage portion 19 of the backrest 14 as shown in FIG. 7. The inflator assembly 30 is located in a rear section of the airbag module AM, while most of the airbag 40 is located in a front section of the airbag module AM. As described above, the bolts 37, which extend from the retainer 32 and are passed through the airbag 40 and the first to third reinforcing fabric sheets 51, 53, 55, are passed through the side frame portion 16 in the backrest 14 and fastened by nuts 38. The fastening fixes the inflator assembly 30 to the side frame portion 16 together with the airbag 40. The inflator assembly 30 may be fixed to the vehicle 10 (the side frame portion 16) by members other than the bolts 37 and the nuts 38.

As shown in FIG. 1, the side airbag apparatus includes an impact sensor 91 and a controller 92 in addition to the above described airbag module AM. The impact sensor 91 is configured by an acceleration sensor, and is attached to the body side portion 11 of the vehicle 10, so as to detect an impact applied to the body side portion 11 from the side. The controller 92 controls the operation of the inflator 31 based on a detection signal from the impact sensor 91.

The side airbag apparatus of the present embodiment is constructed as described above. In this side airbag apparatus, when an impact the magnitude of which is greater than or equal to a predetermined value is applied to the body side portion 11 of the vehicle 10, the impact sensor 91 detects the impact. In response to the detection signal, the controller 92 outputs an actuation signal for actuating the inflator 31 to the inflator 31. In response to the actuation signal, the gas generating agent in the inflator 31 generates high temperature and high pressure inflation gas G, which is jetted radially outward from the gas outlet 33 as shown in FIG. 14(A). While a great amount of the jetted inflation gas G is jetted toward the front of the vehicle 10 through the window 36, some of the inflation gas G is jetted substantially upward through the upper opening 32U of the retainer 32. The pressure of the inflation gas G acts on each part of the airbag 40, which has been folded in the up-down direction and the front-rear direction and in the storage mode. The airbag 40 then starts inflating in the backrest 14.

When the pressure of the inflation gas G starts acting in the airbag 40 in the storage mode, parts other than the inflation limiting portion 50 start being inflated and unfolded. At this time, the parts that have been folded in the later stages (the parts folded in the front-rear direction) prevent the parts that have been folded in the earlier stages (the parts folded in the up-down direction) from being inflated. Therefore, in the airbag 40, which have been folded in two perpendicular directions (the up-down direction and the front-rear direction), inflation and deployment occurs in reverse order of the folding process.

The airbag 40 first starts being inflated while being unfolded (deployed) from the rear section toward the front end. When the deployment in this direction progresses to some extent, the airbag 40 is inflated and deployed in the order of FIGS. 14(B) to 14(D). FIGS. 14(B) to 14(D) show a process in which the parts that have been folded in the up-down direction are inflated and deployed while being unfolded. The parts that have been folded in the front-rear direction are not illustrated in the drawings.

At the beginning of the inflation, the inflation gas G jetted by the inflator assembly 30 first flows into the first folded-back portion 77 among the three folded-back portions 77 to 79, which is the closest to the inflator assembly 30. The inflation gas G then inflates the folded-back portion 77 (see FIGS. 14(B) and 14(C)). When the inflation progresses to some extent, the inflation gas G flows into the adjacent (second) folded-back portion 78, thereby unfolding the folded part between the first folded-back portion 77 and the second folded-back portion 78 (refer to FIG. 14(D)). Next, the second folded-back portion 78 is inflated by the inflation gas G. In this manner, the inflation gas G inflates the folded-back portions 77, 78 toward the third folded-back portion 79, thereby unfolding the folded part between the adjacent folded-back portions 78 and 79. Subsequently, the inflation gas G starts inflating the folded-back portion 79.

Figure 15:
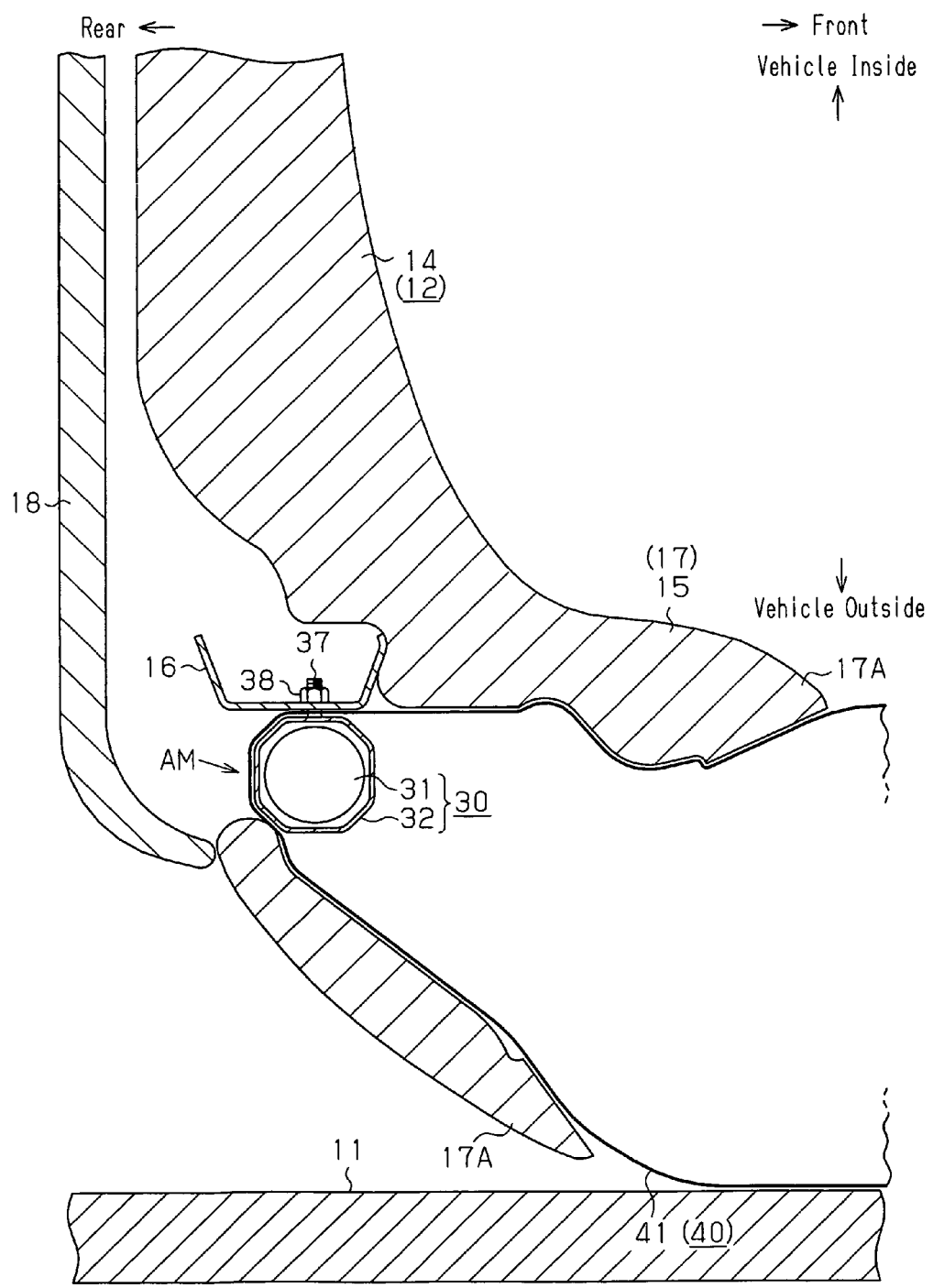
FIG. 15 is a partial cross-sectional plan view showing a state in which the airbag of FIG. 7 has popped out of the backrest and been inflated and deployed.

When the airbag 40 is inflated while being unfolded (deployed) in the front-rear direction and the up-down direction, the seat pad 17 of the backrest 14 is pushed by the airbag 40. The seat pad 17 is then broken at the breakable portion 21 (see FIG. 7) as shown in FIG. 15. The airbag 40 is jetted out from the backrest 14 through the broken part, with a part thereof (a part in the vicinity of the inflator assembly 30) remaining in the backrest 14. Thereafter, the airbag 40 is inflated and deployed toward the front of the vehicle 10 in a space between the occupant P (omitted in FIG. 15) and the body side portion 11, which is bulging into the passenger compartment.

Then, as shown in FIGS. 2 and 3, the inflated and deployed airbag 40 is located between the occupant P and the bulging body side portion 11, thereby restraining the occupant P. The inflation gas G is discharged through the vent hole 47, allowing the internal pressure of the airbag 40 to be easily lowered. The inflation and deployment of the airbag 40 and the subsequent reduction of the internal pressure due to the discharge of the inflation gas G attenuates the impact transmitted to the occupant P from the side through the body side portion 11.

Figure 17:
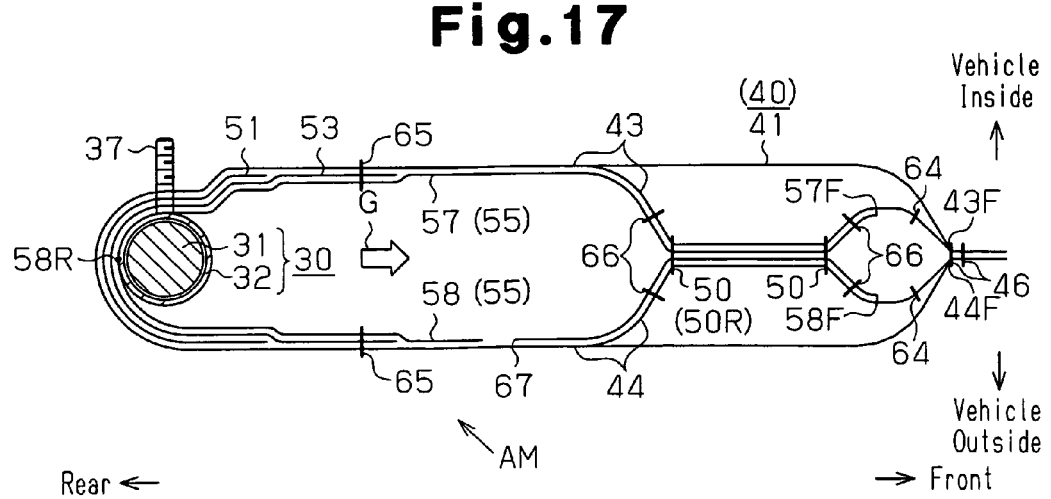
FIG. 17 is a cross-sectional view taken along line 17-17 of FIG. 16.
Figure 18:
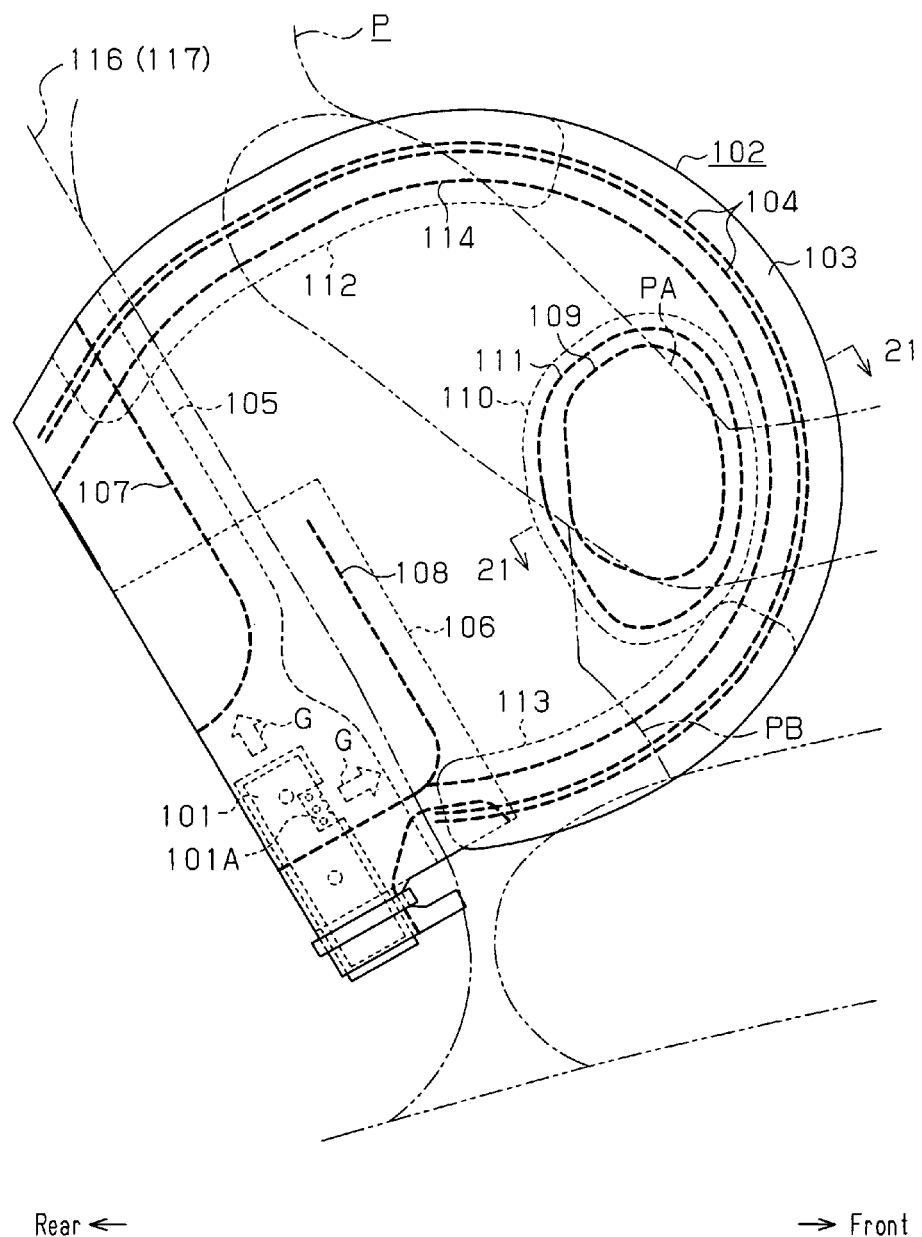
FIG. 18 is a side view schematically showing, together with an occupant, a conventional side airbag apparatus.

At this time, as shown in FIG. 17, the thickness of the airbag 40 in the vehicle width direction (up-down direction as viewed in FIG. 17) is the smallest in a part surrounded by the periphery of the airbag 40 and the inflation limiting portion 50 and increases as the distance from the part increases. The position of the inflation limiting portion 50 in the inflated and deployed airbag 40 corresponds to the arm PA of the occupant P (see FIG. 4). Therefore, if the airbag 40 is inflated and deployed under a condition where the arm PA of an adult occupant P having a normal built is at a position corresponding to the inflation limiting portion 50, the arm PA of the occupant P is prevented from being excessively pushed inward along the vehicle width direction. Inside of the arm PA in the vehicle width direction are the abdomen PB and the thorax PT, which have a relatively low impact resistance. The abdomen PB and the thorax PT are unlikely to be excessively pushed by the arm PA, so that the airbag 40 properly protects the thorax PT and the abdomen PB.

The first to fifth reinforcing fabric sheets 51, 53, 55, 61, 62, which are formed of coated fabric, have higher strength against heat and pressure than the airbag 40, which is formed of non-coated fabric. Among the first to fifth reinforcing fabric sheets 51, 53, 55, 61, 62, the first to third reinforcing fabric sheets 51, 53, 55 reinforce rear sections of the fabric main portions 43, 44. The first to third reinforcing fabric sheets 51, 53, 55 are located between the airbag 40 and the inflator assembly 30 located rearward of the airbag 40, and surround the gas outlet 33. Therefore, the first to third reinforcing fabric sheets 51, 53, 55 receive the inflation gas G immediately after being discharged from the gas outlet 33, thereby reducing the influence of heat and pressure of the inflation gas on the parts to be reinforced. Particularly, since the first to third reinforcing fabric sheets 51, 53, 55 form numerous layers about the gas outlet 33, the effect of reduction in the influence of the inflation gas G is enhanced.

Also, the reinforcing fabric portions 57, 58 of the third reinforcing fabric sheet 55 extend from the rear ends of the fabric main portions 43, 44, which are located outside of the reinforcing fabric portions 57, 58, to the vicinity of the front ends. Therefore, the reinforcing fabric portions 57, 58 reinforce the inflation limiting portion 50 and the parts thereabout in the fabric main portion 43, 44. The reinforcing fabric portions 57, 58 are joined to the fabric main portions 43, 44 by the front joint portions 66. Therefore, when the inflation gas G that is jetted forward from the inflator 31 passes through the space between the inner and outer reinforcing fabric portions 57, 58, parts of the fabric main portions 43, 44 that are located outside of the reinforcing fabric portions 57, 58 are unlikely to be exposed to the inflation gas G. The reinforcing fabric portions 57, 58 reduces the influence of heat and pressure of the inflation gas G on the fabric main portions 43, 44 immediately after the gas G is jetted.

The fabric main portions 43, 44 have parts where no reinforcing fabric sheets are provided. However, these parts are relatively far from the gas outlet 33. The greater the distance from the gas outlet 33, the lower the temperature of the inflation gas G jetted from the gas outlet 33 becomes. When the inflation gas G reaches the positions without reinforcing fabric sheets, the temperature of the gas G has dropped considerably. Thus, although the inflation gas G that is jetted from the gas outlet 33 and flows upward through the third reinforcing fabric sheet 55 directly contacts the fabric main portions 43, 44, the influence of heat and pressure of the inflation gas G on the fabric main portions 43, 44 is limited.

Figure 21:
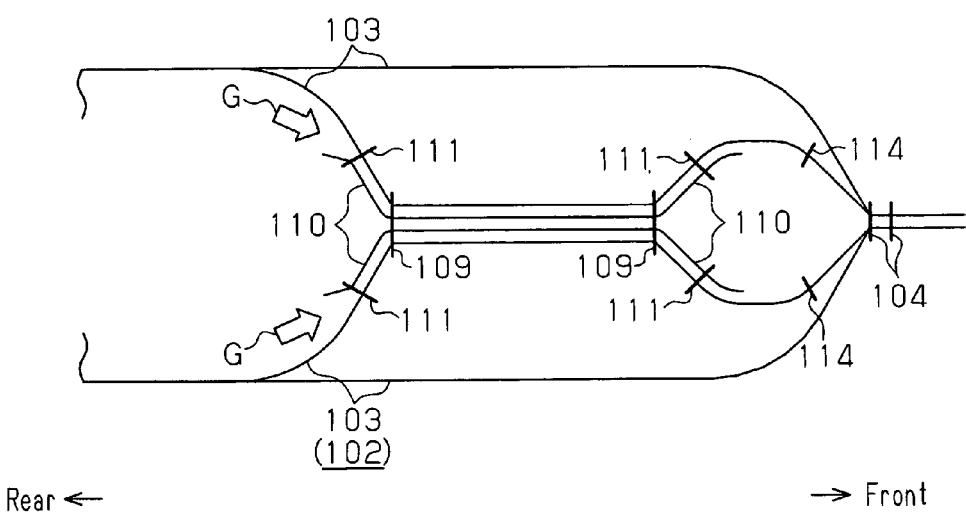
FIG. 21 is a cross-sectional view taken along line 21-21 of FIG. 18.

As described in the BACKGROUND OF THE INVENTION, conventional airbag apparatuses are susceptible to pressure and heat of inflation gas G. That is, in the fabric main portion 103, a part in the vicinity of the inflator 101 and a part in which the inflation limiting portion 109 is located are parts to be reinforced by reinforcing fabric sheets. When providing the different reinforcing fabric sheets 106, 110 for each of these portions, a region without reinforcing fabric sheets exists between the parts to be reinforced. In this case, as shown in FIG. 21, the inflation gas G separates rear sections of the reinforcing fabric sheets 110 from the fabric main portions 103 located outside of the reinforcing fabric sheets 110, and enters the clearances between the reinforcing fabric sheets 110 and the fabric main portions 103. The inflation gas G hits the rear sections of the joint portions 111 and is likely to stay in the clearances. As this phenomenon continues, the rear sections of the joint portions 111 become susceptible to pressure and heat of the inflation gas G.

In this respect, the reinforcing fabric portions 57, 58 shown in FIG. 17 of the present embodiment have long slender shapes and extend from the rear section of the fabric main portions 43, 44 to the vicinity of the front ends 43F, 44F. Thus, the reinforcing fabric portions 57, 58 are provided not only in the vicinity of the gas outlet 33 in the fabric main portions 43, 44 and the inflation limiting portion 50, but also between the vicinity of the gas outlet 33 and the inflation limiting portion 50. Therefore, most of the inflation gas G, which has been jetted forward from the gas outlet 33, flows through the space between the reinforcing fabric portions 57, 58 and is less likely to flow into the clearances between the reinforcing fabric portions 57, 58 and the fabric main portions 43, 44 located outside of the reinforcing fabric portions 57, 58. Also, since the reinforcing fabric portions 57, 58 are pushed along the vehicle width direction and pressed against the fabric main portions 43, 44 by the inflation gas G, the inflation gas G is even less likely to enter the clearances.

Therefore, the inflation gas G that has been jetted forward from the gas outlet 33 is unlikely to separate the reinforcing fabric portions 57, 58 from the fabric main portions 43, 44 located outside of the reinforcing fabric portions 57, 58. Also, the inflation gas G hardly enters the clearances between the reinforcing fabric portions 57, 58 and the fabric main portions 43, 44 and hardly hits the rear sections of the joint portions 66 in the clearance to stay there. As a result, the rear sections of the joint portions 66 are not susceptible to pressure and heat of the inflation gas G. Since the inflation limiting portion 50 is located in a region surrounded by the front joint portions 66, the rear section of the inflation limiting portion 50 in the clearances is also not susceptible to pressure and heat of the inflation gas G.

The rear section of the inflation limiting portion 50 between the reinforcing fabric portions 57, 58 also receives heat and pressure of the inflation gas G jetted forward from the inflator 31. However, since the inflation limiting portion 50 is formed using sewing threads that have higher strength against heat and pressure of the inflation gas G than the front joint portions 66, the inflation limiting portion 50 withstands heat and pressure of the inflation gas G.

The reinforcing fabric portions 57, 58 have a long slender shape extending in the front-rear direction. This shape is effective in reducing the influence of heat and pressure of the inflation gas G on the fabric main portions 43, 44, the inflation limiting portion 50, and the front joint portions 66. At the same time, in the fabric main portions 43, 44, to which the long slender reinforcing fabric portions 57, 58, which extend in the front-rear direction, are joined, the lower halves, in which the reinforcing fabric portions 57, 58 are provided, are harder to stretch and inflate than the upper halves, where the reinforcing fabric portions 57, 58 are not provided.

Figure 16:
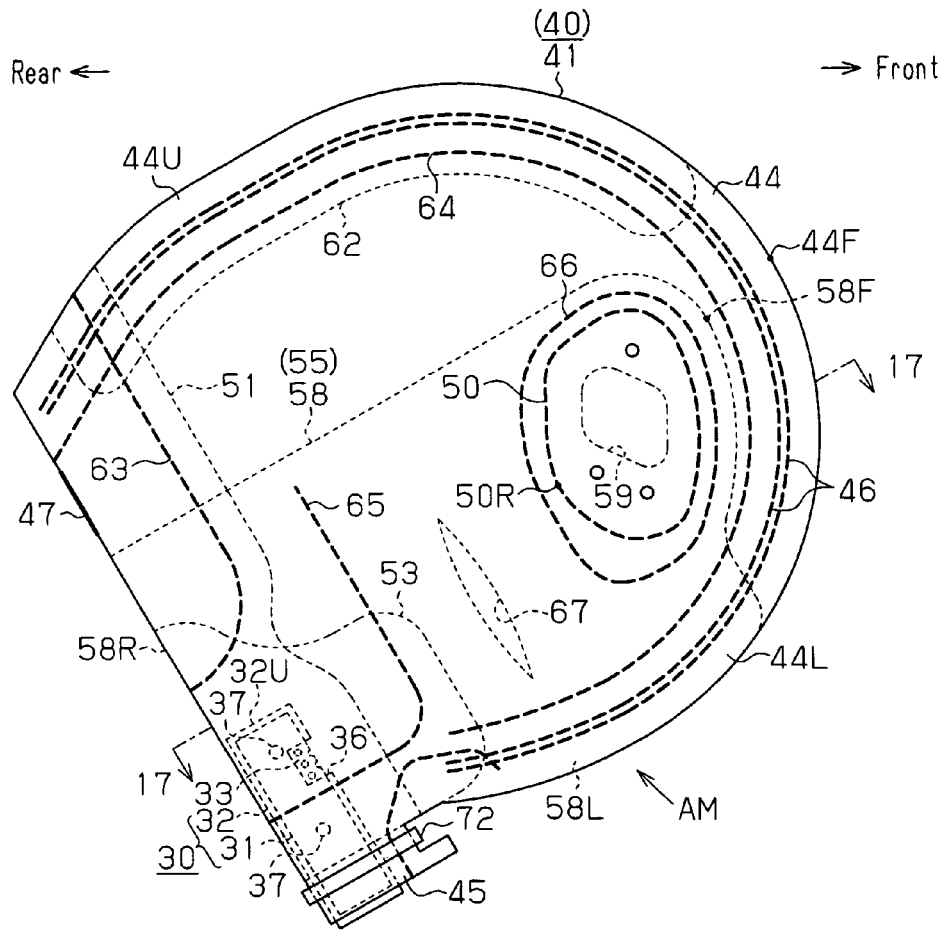
FIG. 16 is a side view illustrating a manner in which a hole of a third reinforcing fabric sheet is deformed at the inflation and deployment of the airbag.

In this respect, the outer reinforcing fabric portion 58 of the present embodiment has the hole 67 in a part between the lower rear joint portion 65 and the front joint portion 66. The hole 67 is deformed as illustrated in FIG. 16, so that the outer fabric main portion 44 is more stretchable and easier to inflate than a case where no hole 67 is formed in the reinforcing fabric portions 57, 58. Particularly, having a narrow shape extending in the up-down direction, the hole 67 is deformed by a greater amount in the front-rear direction than in the up-down direction. Therefore, when the airbag 40 is inflated and deployed toward the front of the vehicle 10 in the space between the occupant P seated in the vehicle seat 12 and the body side portion 11, the hole 67 is greatly deformed in the front-rear direction. Accordingly, a part of the fabric main portion 44 in which the reinforcing fabric portion 58 is provided becomes easy to stretch and inflate forward. This reduces in the fabric main portion 44 the difference in the amount of stretch (inflation amount) between the part with the reinforcing fabric portion 58 and the part without the reinforcing fabric portion 58. Accordingly, the influence of the reinforcing fabric portion 58 on the deployment of the fabric main portion 44 is reduced. When deployed, the airbag 40 behaves in a similar manner to the conventional airbag 102, in which the different reinforcing fabric sheets 105, 106, 110, 112, 113 are provided for reinforcing different parts. The airbag 40 in the storage mode is inflated and deployed as shown in FIGS. 14(B) to 14(D), while demonstrating deployment performance, particularly deployment speed, that is equivalent to that of the conventional airbag 102.

Also, the inflation limiting portion 50, which restricts the thickness of the airbag 40 in the vehicle width direction, is located forward of the center portion C in the front-rear direction of the fabric main portion 44. Accordingly, a part that is inflated and increases its thickness in the vehicle width direction at a position where the third reinforcing fabric sheet 55 is located in the airbag 40 is located between the rear end 50R of the inflation limiting portion 50 and the rear end 58R of the reinforcing fabric portion 58. Therefore, the hole 67 between the rear ends 50R, 58R in the reinforcing fabric portion 58 reliably reduces in the fabric main portion 44 the difference in the amount of stretch (inflation amount) between the part with the reinforcing fabric portion 58 and the part without the reinforcing fabric portion 58.

While no particular object on a vehicle inner side blocks the airbag 40 in a position forward of the occupant P seated in the vehicle seat 12, the body side portion 11 exists on the vehicle outer side. Therefore, although the stretch of the fabric main portion 43 on the vehicle inner side is not restricted from the outside of the airbag 40 in a region forward of the occupant P, the stretch of the fabric main portion 44 on the vehicle outer side is restricted by the body side portion 11. On the other hand, the long slender reinforcing fabric portions 57, 58, which extend in the front-rear direction, restrict the stretch of the fabric main portions 43, 44. Therefore, the resistance of the fabric main portions 43, 44 against stretch (inflation) is more prominent in the outer fabric main portion 44 than in the inner fabric main portion 43. The degree by which the resistance of the fabric main portions 43, 44 against stretch (inflation) influences the deployment performance is greater in sections on the vehicle outer side than in sections in the vehicle inner side.

In this respect, the hole 67 is formed in the outer reinforcing fabric portion 58 in the present embodiment. Therefore, although its stretch is restricted by the body side portion 11 and inhibited by the reinforcing fabric portion 58, the outer fabric main portion 44 is reliably allowed to stretch.

The present embodiment described above has the following advantages.

(1) The reinforcing fabric portions 57, 58 of the third reinforcing fabric sheet 55 extend to a position forward of the center portion C of the fabric main portions 43, 44 in the front-rear direction from the rear ends of the fabric main portions 43, 44, which are located outside of the reinforcing fabric portions 57, 58. The front end of the reinforcing fabric portions 57, 58 are joined to the corresponding fabric main portions 43, 44 by the front joint portions 66. Since the inflation gas G jetted from the gas outlet 33 is directly received by the reinforcing fabric portions 57, 58, the influence of heat and pressure of the inflation gas G on parts of the fabric main portions 43, 44 that are close to the gas outlet 33 is reduced.

(2) The outer reinforcing fabric portion 58 has the hole 67 in a part between the rear end 58R and the front joint portion 66. Therefore, a part (the lower half) of the outer fabric main portion 44, in which the outer reinforcing fabric portion 58 is provided, is more easily stretched and inflated than the case where no hole 67 is formed in the reinforcing fabric portion 58. In the fabric main portion 44, the difference in the amount of stretch (inflation amount) between a part (lower half) in which the reinforcing fabric portion 58 is provided and a part (upper half) in which no reinforcing fabric portion 58 is provided is reduced, so as to reduce the influence of the reinforcing fabric portion 58 on the deployment of the fabric main portion 44. As a result, the airbag 40 is deployed while behaving in a similar manner to the conventional airbag 102, in which the different reinforcing fabric sheets 105, 106, 110, 112, 113 are provided for reinforcing different parts. That is, the airbag 40 demonstrates deployment performance, particularly deployment speed, that is equivalent to that of the conventional airbag 102.

(3) The airbag 40 includes the inflation limiting portion 50, which is located forward of the center portion C in the front-rear direction of the fabric main portions 43, 44. In the airbag 40, the inflation limiting portion 50 and a part in the vicinity of the inflation limiting portion 50 are set as parts to be reinforced. The front end portions of the reinforcing fabric portions 57, 58 are located between the fabric main portions 43, 44 and at a position where the inflation limiting portion 50 is provided. The hole 67 in the outer reinforcing fabric portion 58 is located between the rear end 50R of the inflation limiting portion 50 and the rear end 58R of the reinforcing fabric portion 58.

Therefore, when the airbag 40 pushes the arm PA of the occupant P toward the vehicle inner side, the inflation limiting portion 50 inhibits the thorax PT and abdomen PB from being pressed. In the fabric main portions 43, 44, the reinforcing fabric portions 57, 58 of the third reinforcing fabric sheet 55 reduce the influence of heat and pressure of the inflation gas G not only on the vicinity of the gas outlet 33, but also on the inflation limiting portion 50 and the vicinity of the inflation limiting portion 50.

Further, the parts to be reinforced at two positions are protected by the single third reinforcing fabric sheet 55. Thus, at the production of the side airbag apparatus, the reinforcing fabric portions 57, 58 of the third reinforcing fabric sheet 55 are arranged on predetermined positions of the fabric main portions 43, 44 in the pre-joining spread state. In this manner, the single third reinforcing fabric sheet 55 is arranged at one time on the parts to be reinforced at two positions. Therefore, compared to the conventional side airbag in which the reinforcing fabric sheets 105, 106, 110, 112, 113 are provided for different parts to be reinforced, the number of placement of reinforcing fabric sheets is reduced, and the work for arranging the reinforcing fabric sheets is facilitated.

The inflation limiting portion 50 is located forward of the center portion C in the front-rear direction of the fabric main portions 43, 44. Accordingly, a part that is inflated and increases its thickness in the vehicle width direction at a position where the third reinforcing fabric sheet 55 is located in the airbag 40 is located between the rear end 50R of the inflation limiting portion 50 and the rear ends (58R) of the reinforcing fabric portions 57, 58. The hole 67 is provided between the rear end 50R of the inflation limiting portion 50 and the rear end 58R of the reinforcing fabric portion 58. This reliably reduces in the fabric main portion 44 the difference in the amount of stretch (inflation amount) between the part (lower half) with the outer reinforcing fabric portion 58 and the part (lower half) without the reinforcing fabric portion 58.

(4) In addition to the parts to be reinforced at two positions described above, lower sections 43L, 44L of the peripheries of the fabric main portions 43, 44 are set as parts to be reinforced. Lower ends 57L, 58L of the reinforcing fabric portions 57, 58 are located between the lower sections 43L, 44L of the peripheries of the fabric main portions 43, 44, and joined to the lower sections 43L, 44L by the auxiliary peripheral joint portion 64. Therefore, in the fabric main portions 43, 44, the reinforcing fabric portions 57, 58 of the third reinforcing fabric sheet 55 and the lower section of the auxiliary peripheral joint portion 64 reduce the influence of heat and pressure of the inflation gas G not only on the vicinity of the gas outlet 33 and the vicinity of the inflation limiting portion 50, but also on lower sections 43L, 44L of the peripheral portions of the fabric main portions 43, 44 and the lower section of the auxiliary peripheral joint portion 64.

Further, the parts to be reinforced at the three positions are protected by the single third reinforcing fabric sheet 55. At the production of the side airbag apparatus, the reinforcing fabric portions 57, 58 of the third reinforcing fabric sheet 55 are arranged on predetermined positions of the fabric main portions 43, 44 of the airbag 40 in the pre-joining spread state. Accordingly, a reinforcing fabric sheet (the third reinforcing fabric sheet 55) is arranged at one time on the parts to be reinforced at the three positions. Therefore, compared to the conventional side airbag in which the reinforcing fabric sheets 105, 106, 110, 112, 113 are provided for three different parts to be reinforced, the number of placement of reinforcing fabric sheets is reduced, and the arranging work is further facilitated.

(5) The hole 67 is formed in the outer reinforcing fabric portion 58. Although the stretch of the fabric main portion 44 on the vehicle outer side is restricted by the body side portion 11, and inhibited by the reinforcing fabric portion 58, the hole 67 reliably allows the outer fabric main portion 44 to be easily stretched and inflated. The degree by which the resistance of the fabric main portion 44 against stretch (inflation) influences the deployment performance of the fabric main portion 44 is reliably reduced.

(6) The hole 67 has a narrow shape extending in the up-down direction. Therefore, when the airbag 40 is inflated and deployed, the hole 67 is greatly deformed in the front-rear direction. This allows a part of the fabric main portion 44 in which the reinforcing fabric portion 58 is provided to be easy to stretch and inflate forward.

(7) The hole 67 is formed as a slit. Therefore, the hole 67 can be easily formed by making a cut in the outer reinforcing fabric portion 58.

(8) The rear sections of the reinforcing fabric portions 57, 58 are joined to the fabric main portions 43, 44 by the lower rear joint portion 65, and the front end portion of the reinforcing fabric portions 57, 58 are joined to the fabric main portions 43, 44 by the front joint portions 66. Generally, in the airbag 40 as described above, a part between the lower rear joint portion 65 and the front joint portion 66 in the fabric main portions 43, 44 is a part that is hard to stretch and inflate due to the influence of the reinforcing fabric portions 57, 58. In this respect, the outer reinforcing fabric portion 58 of the present embodiment has the hole 67 that is located in a middle portion between the lower rear joint portion 65 and the front joint portion 66. Thus, the hole 67 allows the middle part to be easily stretched and inflated in the front-rear direction of the vehicle. This reduces in the outer fabric main portion 44 the difference in the amount of stretch between the part (lower half) with the reinforcing fabric portion 58 and the part (upper half) without the reinforcing fabric portion 58.

The present invention may be embodied in the following forms.

The internal joining portion may connect the fabric main portions 43, 44 to each other at a position other than the inflation limiting portion 50, as long as the internal connection portion is located forward of the center portion C in the front-rear direction of the fabric main portions 43, 44.

The present invention may be applied to a side impact airbag apparatus that has no internal joining portion such as the inflation limiting portion 50. In this case, however, the front ends 57F, 58F of the reinforcing fabric portions 57, 58 are located forward of the center portion C in the front-rear direction of the fabric main portions 43, 44. The front end portions of the reinforcing fabric portions 57, 58 are joined to the fabric main portions 43, 44 located outside by the front joint portions 66.

The shapes of the reinforcing fabric sheets other than the third reinforcing fabric sheet 55, that is, the first reinforcing fabric sheet 51, the second reinforcing fabric sheet 53, the fourth reinforcing fabric sheet 61, and the fifth reinforcing fabric sheet 62 may be changed. One or more of the reinforcing fabric sheets other than the third reinforcing fabric sheet 55 may be omitted as necessary.

For example, the fourth reinforcing fabric sheet 61 and the fifth reinforcing fabric sheet 62 may be formed integrally. In this case, the reinforcing fabric sheets 61, 62 are formed by a single fabric sheet.

Figure 19:
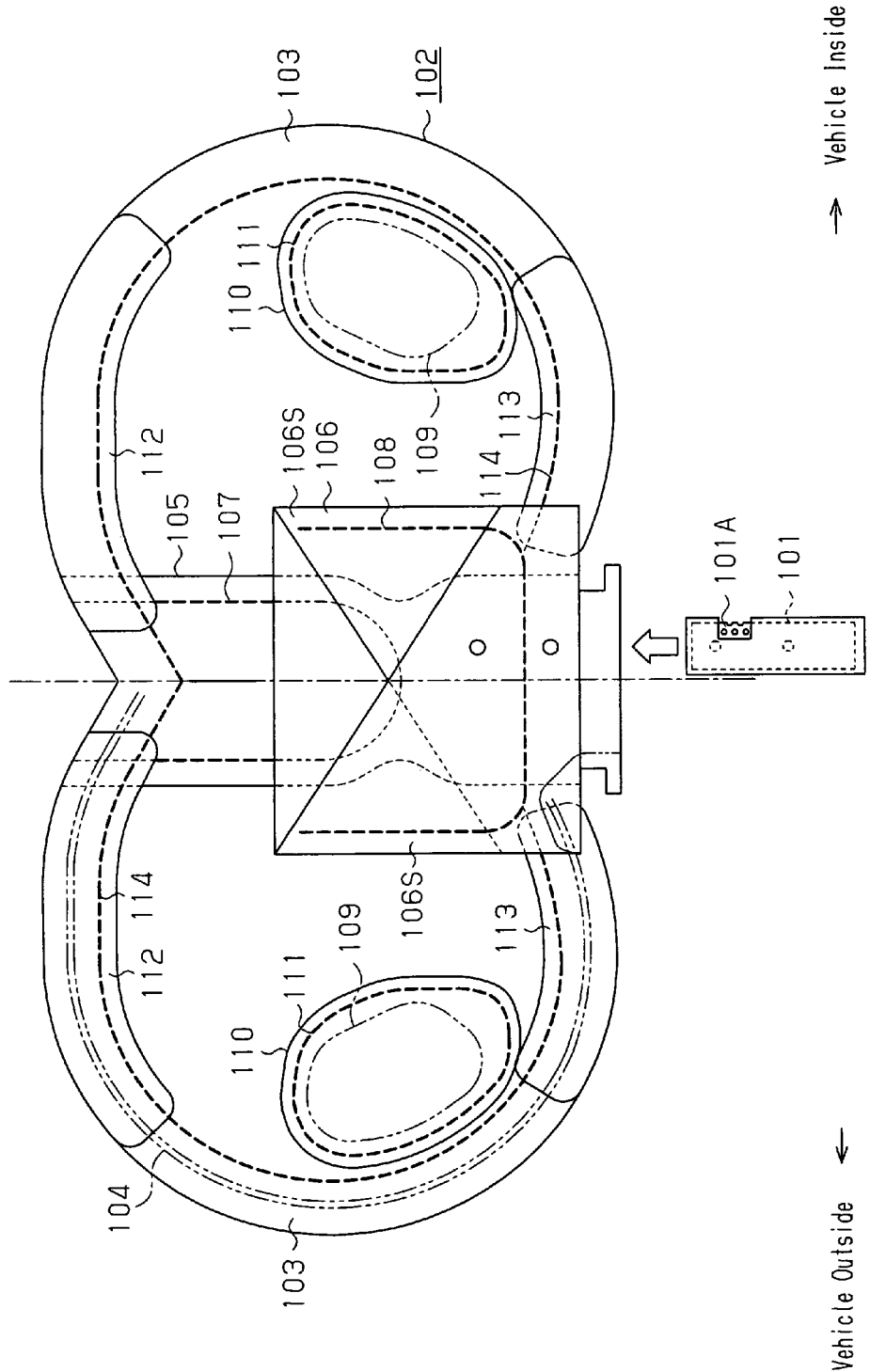
FIG. 19 is a diagram of a state in the production of the airbag module of FIG. 18, showing the positional relationship among the airbag in a pre-joining spread state, reinforcing fabric sheets, and an inflator assembly.
Figure 20:
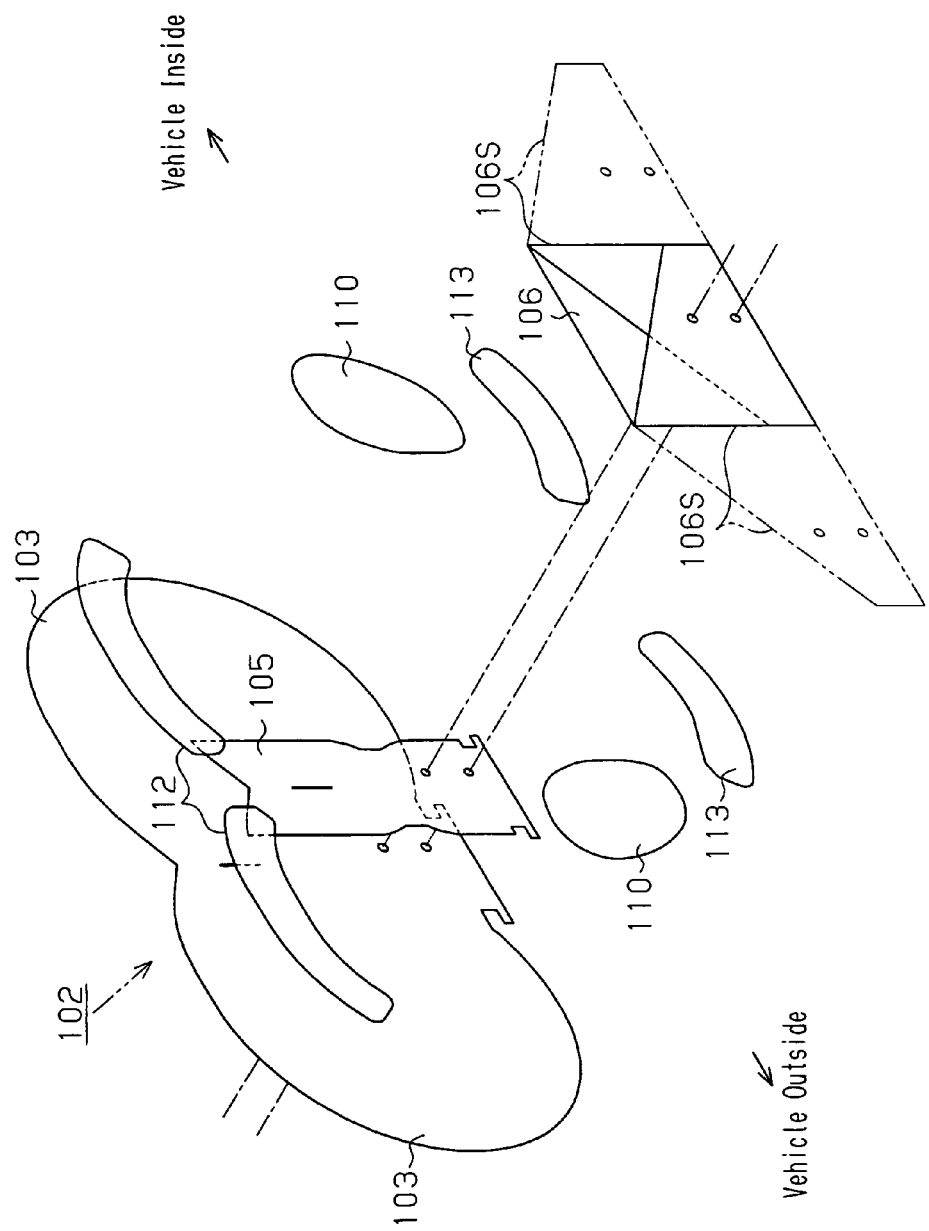
FIG. 20 is an exploded perspective view illustrating the side airbag apparatus of FIG. 18, showing a state before the reinforcing fabric sheets are joined to the airbag.

Also, the first reinforcing fabric sheet 51 and the second reinforcing fabric sheet 53 may be formed integrally. In this case, the reinforcing fabric sheets 51, 53 are formed by a single fabric sheet. In this case, a part that corresponds to the second reinforcing fabric sheet 53 may be folded back toward the fold line 42 as in the case of FIGS. 19 and 20. Such multiple layers of the fabric sheet increases the strength of the fabric sheet against heat and pressure of the inflation gas G.

The shapes of the upper rear joint portion 63, the auxiliary peripheral joint portion 64, the lower rear joint portion 65, and the front joint portion 66 may be changed to different shapes from those shown in the above embodiment.

For example, the side portions of the lower rear joint portions 65 (elongated portions) may be closer to the fold line 42 than those in the above embodiment. In an extreme case, the long slender portions may coincide with the position of the fold line 42. Further, the long slender portions of the lower rear joint portion 65 may be omitted.

Parts of the peripheries of the fabric main portions 43, 44 where the fourth reinforcing fabric sheet 61 and the fifth reinforcing fabric sheet 62 are not provided do not need to be joined by the auxiliary peripheral joint portion 64. In this case, the auxiliary peripheral joint portion 64 is divided at these parts.

In addition to or in place of the outer reinforcing fabric portion 58, the hole 67 may be formed in the inner reinforcing fabric portion 57, as long as the hole 67 is formed in at least one of the reinforcing fabric portions 57, 58.

The shape of the hole 67 may be changed to a shape different from that in the above embodiment. For example, the hole 67 may have a cross shape. The hole 67 does not need to be formed as a slit, but may have a predetermined width and extend in the up-down direction.

Alternatively, the hole 67 may be replaced by a narrow hole extending in a direction other than the up-down direction.

The airbag 40 in the post-joining spread state may be folded up in a manner different from that in the above embodiment.

Instead of the backrest 14 of the vehicle seat 12, the storage portion 19 of the airbag module AM may be provided in the body side portion 11.

The present invention may be applied to a side airbag apparatus that protects the lumbar region, a shoulder, or the head of the occupant P, in addition to or in place of the thorax PT and the abdomen PB.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus for protecting an occupant seated in a seat of a vehicle, comprising:
   an airbag that is formed by laying a pair of fabric main portions on top of each other in the width direction of the vehicle and joining the fabric main portions to each other at peripheries;
   an inflator that is located inside and in a rear section of the airbag, the inflator having a gas outlet,
   wherein, in response to an impact from a side applied to the vehicle, the inflator jets inflation gas from the gas outlet, thereby inflating and deploying the airbag toward the front of the vehicle in a space between the occupant seated in the vehicle seat and a body side portion of the vehicle; and
   a reinforcing fabric sheet having a pair of reinforcing fabric portions, the reinforcing fabric portions being laid on the inner surfaces of the fabric main portions,
   wherein the reinforcing fabric portions extend to a position forward of a center portion of the fabric main portions in a front-rear direction from rear sections of the fabric main portions, which are located outside of the reinforcing fabric portions, front ends of the reinforcing fabric portions being joined to the fabric main portions by front joint portions, and wherein at least one of the reinforcing fabric portions has a hole at a position between the rear end of the reinforcing fabric portion and the front joint portions, wherein the airbag has an internal joining portion for connecting the fabric main portions to each other at a position forward of the center in the front-rear direction while bringing the fabric main portions close to each other, the internal joining portion having a rear end, wherein the front end of each reinforcing fabric portion is located between the fabric main portions and at a position where the internal joining portion is located, wherein the hole is located between the rear end of the internal joining portion and the rear end of the reinforcing fabric portion in which the hole is provided.

2. The side airbag apparatus according to claim 1, wherein the internal joining portion is an inflation limiting portion that connects the fabric main portions to each other at a position corresponding to an arm of the occupant while bringing the fabric main portions close to each other, and, at this position, limits the thickness of the airbag in the width direction of the vehicle, thereby inhibiting the arm from being pushed toward the vehicle inner side.

3. The side airbag apparatus according to claim 1, wherein a lower end of each reinforcing fabric portion is located between and joined to lower portions of the peripheries of the fabric main portions.

4. The side airbag apparatus according to claim 1, wherein the hole is provided at least in the reinforcing fabric portion located on the vehicle outer side so as to allow the reinforcing fabric sheet to be easily stretched in the front-rear direction.

5. The side airbag apparatus according to claim 1, wherein the hole has a narrow shape extending substantially in an up-down direction.

6. The side airbag apparatus according to claim 5, wherein the hole is shaped like a slit.

7. The side airbag apparatus according to claim 1, wherein the rear section of each reinforcing fabric portion is joined by a rear joint portion to the rear section of the corresponding fabric main portion located outside of the reinforcing fabric portion, and wherein the hole is located forward of the rear joint portion of the reinforcing fabric portion in which the hole is provided.

* * * * *